United States Patent
Singenberger et al.

(10) Patent No.: US 11,412,744 B2
(45) Date of Patent: Aug. 16, 2022

(54) PRESS FOR FORM PRESSING MEAT PRODUCTS, AND METHOD OF USE

(71) Applicant: Provisur Technologies, Inc., Chicago, IL (US)

(72) Inventors: Ralph Singenberger, Uzwil (CH); Marcel Twardawa, Winterthur (CH)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 59 days.

(21) Appl. No.: 16/859,133

(22) Filed: Apr. 27, 2020

(65) Prior Publication Data

US 2021/0329930 A1    Oct. 28, 2021

(51) Int. Cl.
*A22C 7/00*    (2006.01)
*A23P 30/10*    (2016.01)

(52) U.S. Cl.
CPC .............. *A22C 7/003* (2013.01); *A23P 30/10* (2016.08)

(58) Field of Classification Search
CPC ..... A22C 7/0046; A22C 7/0061; A23P 30/10; A23P 30/20
See application file for complete search history.

(56) References Cited

U.S. PATENT DOCUMENTS

| | | |
|---|---|---|
| 2,043,366 A | 6/1932 | Bech |
| 2,241,807 A | 5/1941 | Cotner |
| 2,565,245 A | 8/1951 | Lebovitz |
| 2,880,668 A | 4/1959 | Cranke |
| 3,211,086 A | 10/1965 | Pearce |
| 3,229,621 A | 1/1966 | Decker et al. |
| 3,285,162 A | 11/1966 | Schneider et al. |
| 3,326,120 A | 6/1967 | Schneider et al. |
| 3,327,622 A * | 6/1967 | Lebovitz ................. B30B 11/28 425/408 |
| 3,727,545 A | 4/1973 | Madsen et al. |
| 3,753,398 A * | 8/1973 | Dohm, Jr. ............ A22C 7/0023 100/249 |
| 3,759,170 A | 9/1973 | Bettcher |
| 3,842,260 A * | 10/1974 | Christensen ......... A22C 7/0061 250/221 |
| 3,901,140 A | 8/1975 | Dohm, Jr. |

(Continued)

FOREIGN PATENT DOCUMENTS

| | | |
|---|---|---|
| EP | 2308313 B1 | 3/2016 |
| WO | 90/03736 A1 | 4/1990 |

OTHER PUBLICATIONS

Canadian Patent Application 3,079,712 Office Action dated Dec. 2, 2021.

(Continued)

*Primary Examiner* — Seyed Masoud Malekzadeh
(74) *Attorney, Agent, or Firm* — Klintworth & Rozenblat IP LLP

(57) ABSTRACT

In an embodiment, a form press includes three die assemblies which form press a meat product along the height, width and length thereof. Each die assembly includes a single proportional directional valve which operates a hydraulic cylinder under control of a controller. The three die assemblies are first operated under position control, and are thereafter operated under force/position control. The form press has a single hydraulic circuit which operates the die assemblies.

22 Claims, 20 Drawing Sheets

(56) References Cited

U.S. PATENT DOCUMENTS

| | | | |
|---|---|---|---|
| 4,147,485 A * | 4/1979 | Zimmerman | A22C 7/00 425/149 |
| 4,273,789 A * | 6/1981 | Zimmerman | A22C 7/00 264/40.5 |
| 4,967,652 A | 11/1990 | Mally | |
| 5,431,935 A | 7/1995 | Carey | |
| 5,568,766 A | 10/1996 | Otremba et al. | |
| 5,638,748 A | 6/1997 | Daniel | |
| 5,682,742 A | 11/1997 | Sato et al. | |
| 5,701,811 A | 12/1997 | Kawakami | |
| 5,913,956 A | 6/1999 | Capps | |
| 5,979,210 A | 11/1999 | Baur et al. | |
| 6,089,849 A * | 7/2000 | Bulgrin | B29C 45/82 425/149 |
| 6,108,587 A * | 8/2000 | Shearer | B29C 45/82 700/200 |
| 6,156,358 A * | 12/2000 | Soper | A22C 7/00 99/426 |
| 6,530,311 B1 | 3/2003 | Wilkens et al. | |
| 6,941,783 B2 | 9/2005 | Yamanaka et al. | |
| 7,481,158 B2 | 1/2009 | Gemgross et al. | |
| 7,501,140 B2 | 3/2009 | Gould et al. | |
| 7,578,732 B2 | 8/2009 | Lennox, III | |
| 7,687,093 B2 | 3/2010 | Nielsen | |
| 8,962,055 B2 | 2/2015 | Groneberg-Nienstedt | |
| 9,526,257 B1 | 12/2016 | Farrant et al. | |
| 2015/0093488 A1 | 4/2015 | Gutmann et al. | |
| 2017/0035066 A1 | 2/2017 | Hukelmann | |
| 2019/0281843 A1 | 9/2019 | Volkl et al. | |

OTHER PUBLICATIONS

"Hoegger, Operating the Machine."
"BT-Hydraulik AG, Hydraulikaggregat 22 kW, IP320.04 mit Dynamisch Pressen," Jan. 6, 2014."
"Hoegger, Pneumatik IP320, Art-Nr. 152367, Mar. 30, 2015."
"Hoegger, Machine Description, Applies to 174578, 205944, 207841."
"Electrical Schematic, IP320& B321x, Hoegger AG, Mar. 13, 2019."

* cited by examiner

PRESS FOR FORM PRESSING MEAT PRODUCTS, AND METHOD OF USE

FIELD OF THE DISCLOSURE

The present disclosure generally relates to a press for form pressing meat products into consistent product shapes and desirable dimensions, and its method of use.

BACKGROUND

Form presses which are used to press meat products, such as bacon, ham, smoked meat, dried meat, formed pieces of poultry, formed pieces of fish, under high pressure to form consistent product shapes and desirable dimensions are known. Form pressing provides application versatility and helps to reduce raw material costs. Form presses apply a pressing force to the meat product to deform the meat product by compression into blocks to match the size and shape of dies of the form press. After form pressing, the block maintains the shape, and can thereafter be further processed, such as being sliced. These form presses are ideal for forming fresh meat, either with or without bones, that is crust frozen or partially frozen.

Prior art form presses use an open loop system. In an open loop system, a hydraulic cylinder that is used to drive the die is always driven a predetermined press position. This can cause overpressing of the meat product.

SUMMARY

In one aspect of the disclosure, a press for form pressing meat products into consistent product shapes and desirable dimensions is provided. The form press includes three die assemblies which form press a meat product along the height, width and length thereof. Each die assembly includes a single proportional directional valve which operates a hydraulic cylinder under control of a controller. The three die assemblies are first operated under position control, and are thereafter operated under force/position control. The form press has a single hydraulic circuit which operates the die assemblies.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
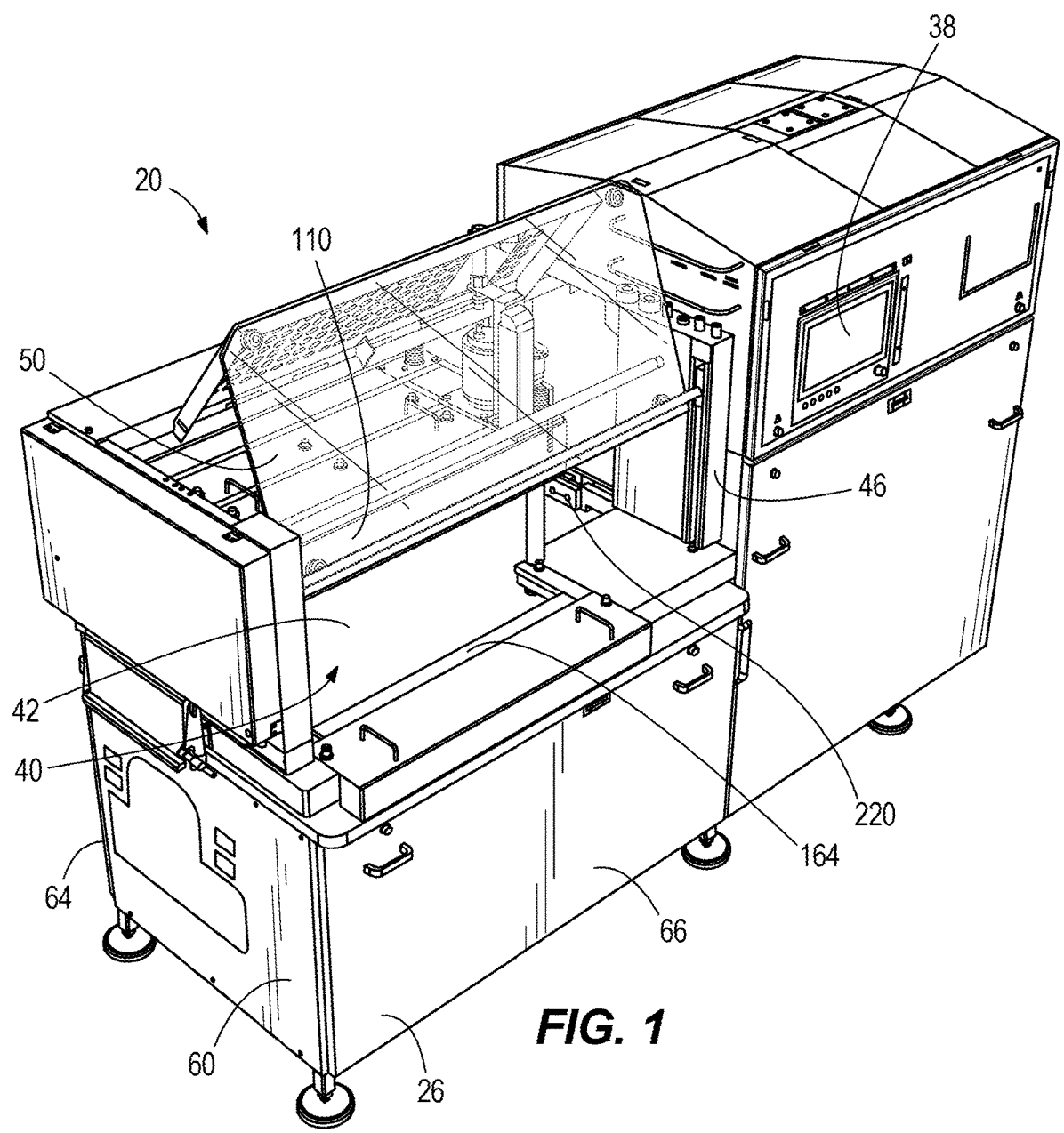
FIG. 1 depicts a perspective view of a form press.

A form press 20 which automatically form presses meat products 22, such as bacon, ham, smoked meat, dried meat, formed pieces of poultry, formed pieces of fish, under high pressure into blocks of meat 24 is provided. The blocks of meat 24 have consistent product shapes and dimensions after being processed by the form press 20. The form press 20 provides controlled and three-dimensional press forming of the meat products 22, which maximizes yield at minimum operating costs, even with large deformations in the meat product 22. The form press 20 is user-friendly and provides for a simple operation.

The form press 20 includes a frame 26 which is mounted on a horizontal ground surface and which supports a first die assembly 28 which is used to compress the meat product 22 along its height, a second die assembly 30 which is used to compress the meat product 22 along its width, and a third die assembly 32 which is used to compress the meat product 22 along its length. The frame 26 further supports a hydraulic system 34 which is used to activate the dies assemblies 28, 30, 32 under control of a controller 36. A user interface 38 is provided and is coupled to the controller 36. The user interface 38 may be on the form press 20 or may be connected thereto by a wired connection or wirelessly connected.

An upper front compartment 40 is defined by the frame 26 and includes a planar press plate 42 having front, rear and side walls 44, 46, 48, 50 extending upwardly therefrom, and a top wall 52 closing the upper ends of the walls 44, 46, 48, 50. A longitudinal axis 54 of the form press 20 is defined between the front and rear walls 44, 46. An openable exit gate 56 is provided as part of the front wall 44 and can be opened to allow access to the upper front compartment 40 and closed to prevent access to the upper front compartment 40. One of the side walls 50 and part of the top wall 52 are openable to allow access into the upper front compartment 40 so that the meat product 22 is inserted into a press chamber provided in the upper front compartment 40 for form pressing by the die assemblies 28, 30, 32.

A lower front compartment 58 is defined by the frame 26 and includes front, rear and side walls 60, 62, 64, 66 extending downwardly from the press plate 42, and a bottom wall 68 closing the lower ends of the walls 60, 62, 64, 66. A first internal support wall 70 extends between the press plate 42 and the bottom wall 62, extends in the longitudinal direction between the front and rear walls 60, 62, and is proximate to, but spaced from the side wall 64. A second internal support wall 72 extends between the press plate 42 and the bottom wall 62, extends in the longitudinal direction between the front and rear walls 60, 62. The first and second internal support walls 70, 72 are spaced apart from each other. A third internal support wall 74 extends from the lower surface of the press plate 42, is spaced from the second internal support wall 72, and proximate to, but spaced from, the side wall 66.

An upper rear compartment 80 is defined by the frame 26 and includes a lower wall 82, a front wall defined by the rear wall 46 of the upper front compartment 40 and which extends upwardly from the lower wall 82, rear and side walls 84, 86, 88 extending upwardly from the lower wall 82, and a top wall 90 closing the upper ends of the walls 46, 84, 86, 88. The upper rear compartment 80 contains the controller 36 and other electronics which are used to operate the form press 20.

A lower rear compartment 92 is defined by the frame 26 and includes a front wall defined by the rear wall 62 of the lower front compartment 58 and extending downward from the lower wall 82, rear and side walls 94, 96, 98 extending downwardly from the lower wall 82, and a bottom wall 100 closing the lower ends of the walls 62, 94, 96, 98. An upper horizontal support wall 102 extends from the front wall 62 toward the rear wall 94. A lower horizontal support wall 104 extends from the front wall 62 toward the rear wall 94 and is spaced vertically below the upper horizontal support wall 102. The hydraulic system 34 is provided in the lower rear compartment 92.

Figure 2:
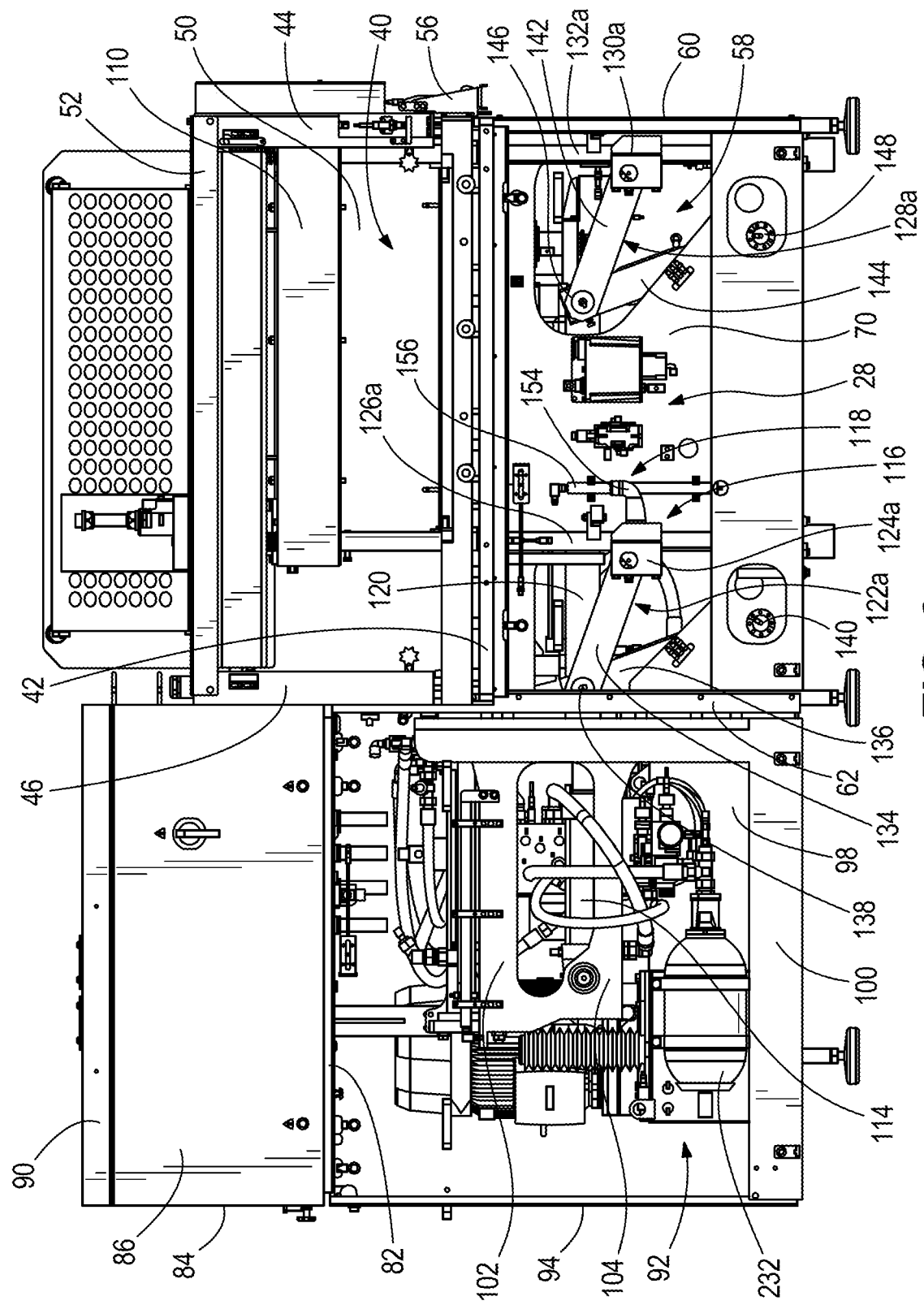
FIG. 2 depicts a side elevational views of the form press with some of the covers removed so that interior components can be seen.
Figure 3:
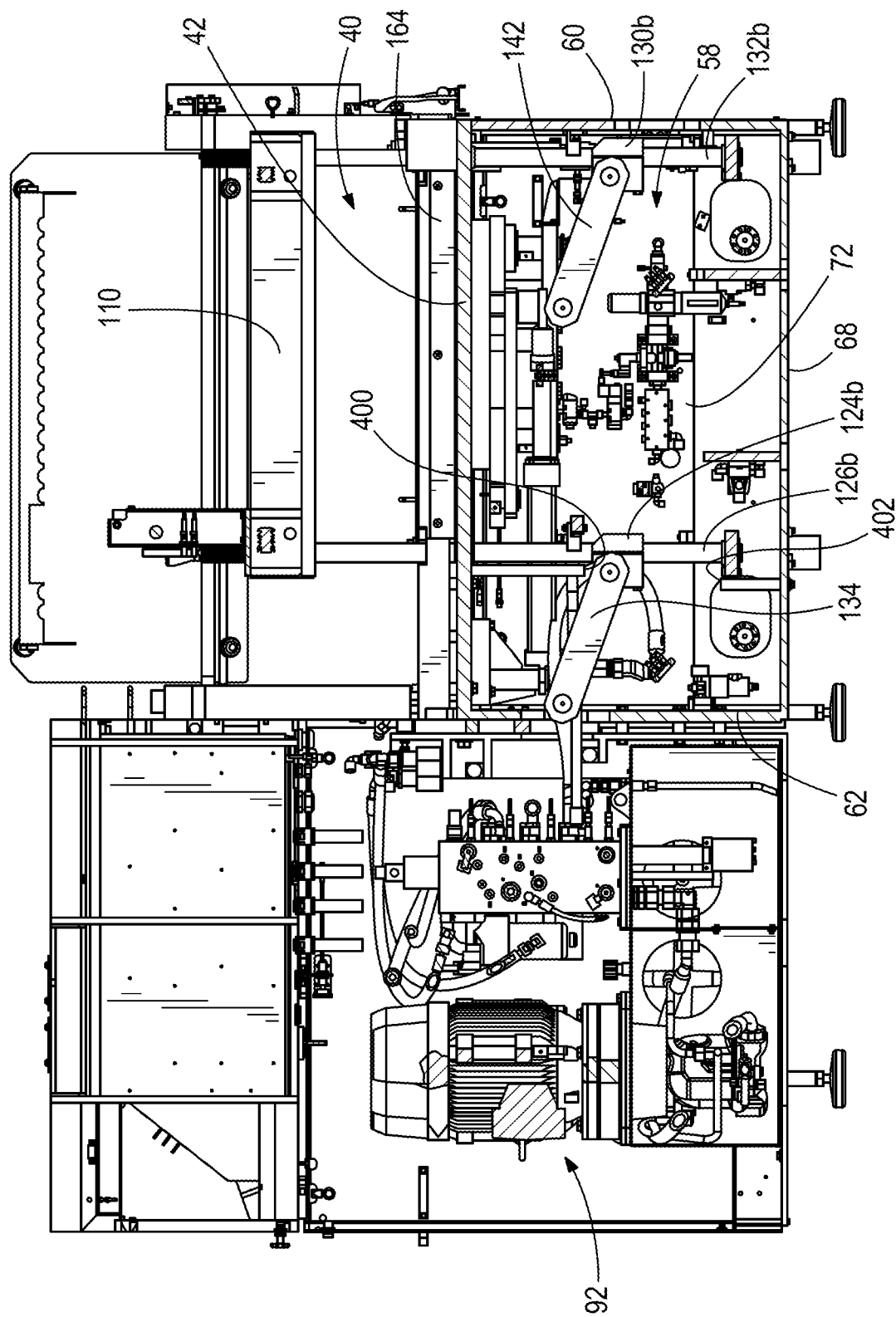
FIG. 3 depicts a cross-sectional view of the form press viewed from the side of the form press shown in FIG. 2.
Figure 4:
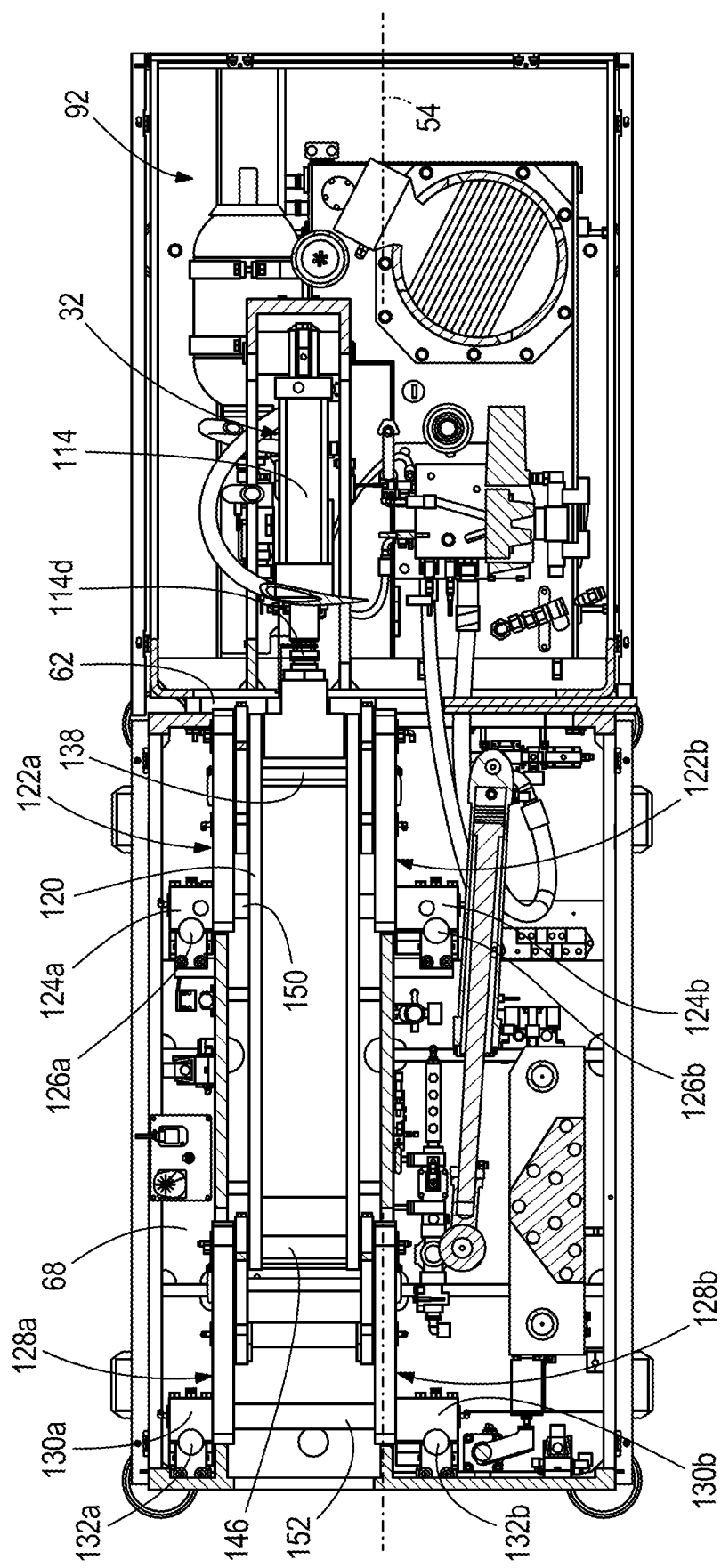
FIG. 4 depicts a cross-sectional view of the form press viewed from a top of the form press.
Figure 5:
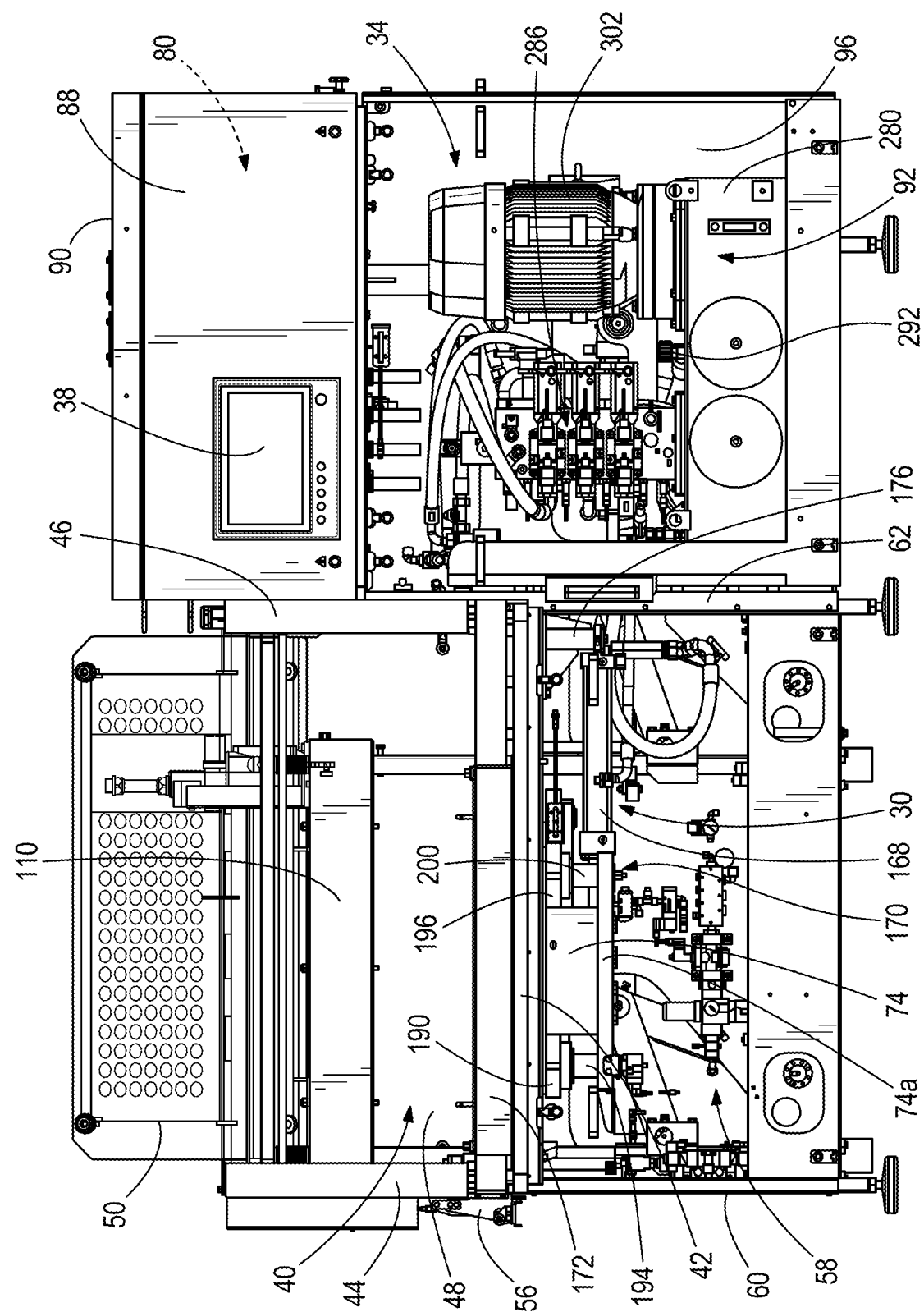
FIG. 5 depicts the other side elevational views of the form press with some of the covers removed so that interior components can be seen.

As shown in FIGS. 2-4, the first die assembly 28 which is used to compress the meat product 22 along its height includes a die plate 110 on which a die 112 is removably mounted, a hydraulic cylinder 114 which is controlled by the controller 36, a linkage 116 for connecting the die plate 110 to the hydraulic cylinder 114, and a position sensor assembly 118. The hydraulic cylinder 114 is mounted on the lower support wall 104 in the lower rear compartment 92. A variety of shapes of dies 112 may be attached to the die plate 110 to provide different shapes to the top surface of the meat product 22 when the meat product 22 is compressed along its height.

Figure 10:
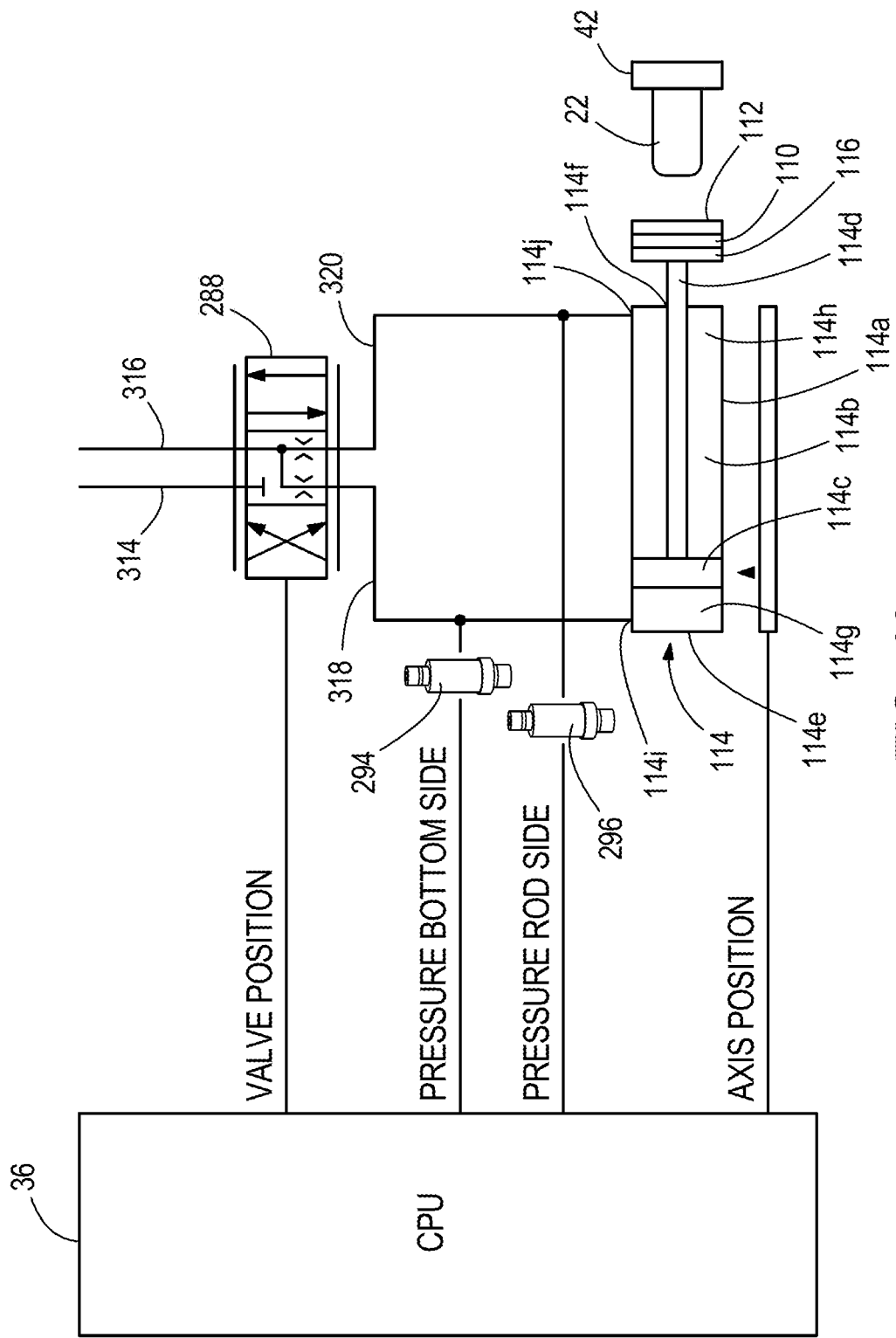
FIGS. 10-12 depict schematic representations of components of the form press.

The hydraulic cylinder 114, see FIG. 10, is conventionally formed and includes a housing 114a having a chamber 114b therein in which a piston 114c and a piston rod 114d are seated. The chamber 114b within the housing 114a has a closed end 114e and an opposite end 114f through which the piston rod 114d extends. The piston 114c is within the chamber 114b and separates the chamber 114b into a bottom side chamber 114g and a rod side chamber 114h. A bottom-end port 114i allows hydraulic fluid to flow into or out of the bottom side chamber 114g, and a rod-end port 114j allows hydraulic fluid to flow into or out of the rod side chamber 114h. The piston rod 114d extends through the wall 62 and into the lower front compartment 58 below the press plate 42.

An example of the linkage 116 is shown in the drawings, although it is to be understood that the linkage 116 may take a variety of forms. The linkage 116 includes a bar 120 connected at a rear end thereof to the piston rod 114d, first and second rear scissor-like arms 122a, 122b connected to the bar 120 and to the internal support walls 70, 72, blocks 124a, 124b connected to the arms 122a, 122b, draw bars 126a, 126b which extend through the press plate 42 and on which the blocks 124a, 124b are fixedly mounted, first and second front scissor-like arms 128a, 128b connected to the bar 120 and to the internal support walls 70, 72 and spaced forwardly of the rear scissor-like arms 122a, 122b, blocks 130a, 130b connected to the arms 122a, 122b, draw bars 132a, 132b which extend through the press plate 42 and on which the blocks 130a, 130b are fixedly mounted.

The bar 120 extends longitudinally parallel to the longitudinal axis 54 in the lower front compartment 58 and underneath the press plate 42.

The draw bars 126a, 126b extend vertically and are forward of the arms 122a, 122b. Each rear arm 122a, 122b has an upper arm section 134 and a lower arm section 136. An upper end of the lower arm section 136 is pivotally connected to a rear end of the upper arm section 134 by a pivot rod 138 which extend through both arms 122a, 122b and the bar 120. The pivot rod 138 is proximate to a rear end of the bar 120. A front end of the upper arm section 134 of arm 122a is pivotally attached to the block 124a. A front end of the upper arm section 134 of arm 122b is pivotally attached to the block 124b. A lower end of the lower arm section 136 is pivotally connected to the internal support walls 70, 82 by a pivot rod 140 which extend through both arms 122a, 122b and the bar 120. The blocks 124a, 124b are connected together by a rod 150.

The draw bars 132a, 132b extend vertically and are forward of the arms 128a, 128b. Each rear arm 128a, 128b has an upper arm section 142 and a lower arm section 144. An upper end of the lower arm section 144 is pivotally connected to a rear end of the upper arm section 142 by a pivot rod 146 which extend through both arms 128a, 128b and the bar 120. The pivot rod 146 is proximate to a front end of the bar 120. A front end of the upper arm section 142 of arm 128a is pivotally attached to the block 130a. A front end of the upper arm section 142 of arm 128b is pivotally attached to the block 130b. A lower end of the lower arm section 144 is pivotally connected to the internal support walls 70, 82 by a pivot rod 148 which extend through both arms 128a, 128b and the bar 120. The blocks 124a, 124b are connected together by a rod 152.

The die plate 110 is mounted in the upper front compartment 40 on upper ends of the draw bars 126a, 126b, 132a, 132b above the press plate 42. The die plate 110 is movable in a vertical direction along relative to the press plate 42 by movement of the linkage 116 under action of the hydraulic cylinder 114 such that the die plate 110 and die 112 move along a first press axis 153 which is normal to the longitudinal axis 54. Preferably, the draw bars 126a, 126b, 132a, 132b are provided at the corners of the die plate 110.

The position sensor assembly 118 includes a magnet 154 mounted on one of the blocks, for example, block 124a, and a linear position sensor 156 mounted on the support wall 70 forward of the draw bar 126a. The magnet 154 overlaps the position sensor 156. The position sensor 156 is coupled to the controller 36 and provides information thereto regarding the linear position of the block 124a relative to the frame 26. The controller 36 processes this information to determine the longitudinal axis position of the piston 114c relative to the housing 114a of the hydraulic cylinder 114, and thus the position of the die plate 110 and die 112 relative to the press plate 42.

As shown in FIGS. 5-8, the second die assembly 30 which is used to compress the meat product 22 along its width includes a die plate 164 on which a die 166 is removably mounted, a hydraulic cylinder 168 which is controlled by the controller 36, a linkage 170 for connecting the die plate 164 to the hydraulic cylinder 168, a stop bar 172, and a position sensor assembly 174. The die plate 164 and the die 166 form a second die set. A variety of shapes of dies 166 may be attached to the die plate 164 to provide different shapes to the sides of the meat product 22 when the meat product 22 is compressed along its width.

Figure 11:
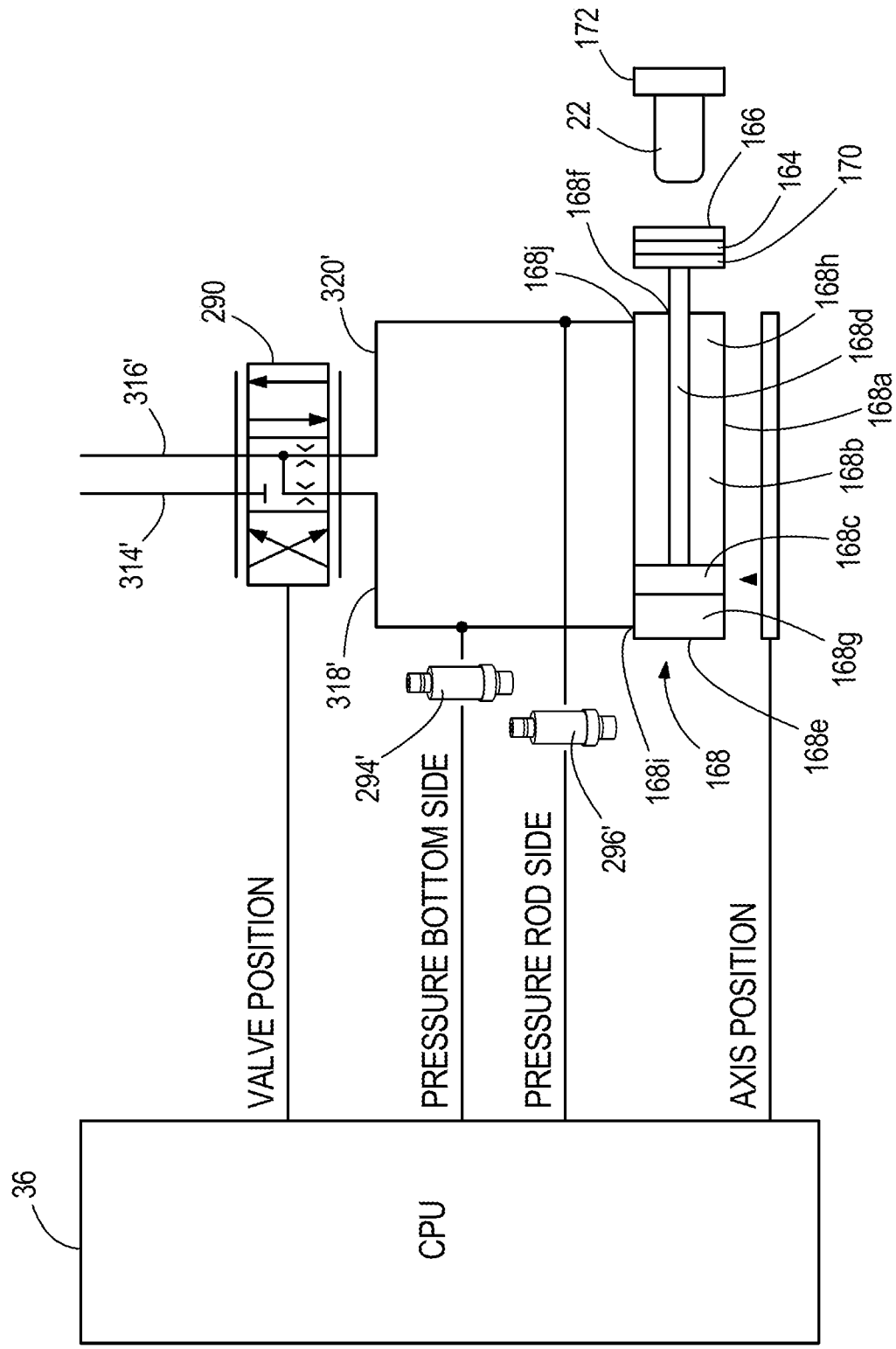

The hydraulic cylinder 168, see FIG. 11, is conventionally formed and includes a housing 168a having a chamber 168b therein in which a piston 168c and a piston rod 168d are seated. The chamber 168b within the housing 168a has a closed end 168e and an opposite end 168f through which the piston rod 168d extends. The piston 168c is within the chamber 168b and separates the chamber 168b into a bottom side chamber 168g and a rod side chamber 168h. A bottom-end port 168i allows hydraulic fluid to flow into or out of the bottom side chamber 168g, and a rod-end port 168j allows hydraulic fluid to flow into or out of the rod side chamber 168h. The hydraulic cylinder 168 is pivotally mounted to the lower surface of the press plate 42 at a pivot 176 in the lower front compartment 58 proximate to the side wall 66. The piston rod 168d extends forwardly into the lower front compartment 58 below the press plate 42.

The die plate 164 is seated on the upper surface of the press plate 42 and is movable relative thereto under action of the linkage 170. The die plate 164 moves along a second press axis 177 which is normal to the longitudinal axis 54 and is normal to the first press axis 153.

The stop bar 172 is fixedly mounted on the upper surface of the press plate 42, extends longitudinally, and is proximate to the side wall 64.

An example of the linkage 170 is shown in the drawings, although it is to be understood that the linkage 170 may take a variety of forms. The linkage 170 includes a bar 178 having a front end pivotally connected to the piston rod 168d and to a front arm 180 at a pivot 182, and a rear arm 184 pivotally connected to a rear end of the bar 178 at a pivot 186. In a non-press position, the bar 178 extends longitudinally parallel to the longitudinal axis 54 in the lower front compartment 58 and underneath the press plate 42.

The front arm 180 has a lower arm section 190 positioned below the press plate 42, an upper arm section 192 positioned above the press plate 42, and a vertical connecting section 194 which extends vertically between the arm sections 190, 192 and passes through the press plate 42. The arms 190, 192 and the connecting section 194 are fixed relative to each other. The end of the lower arm section 190 is pivotally attached to the front end of the bar 178 and to the piston rod 168d at the pivot 182.

The rear arm 184 has a lower arm section 196 positioned below the press plate 42, an upper arm section 198 positioned above the press plate 42, and a vertical connecting section 200 which extends vertically between the arm sections 196, 198 and passes through the press plate 42. The arms 196, 198 and the connecting section 200 are fixed relative to each other. The end of the lower arm section 196 is pivotally attached to the rear end of the bar 178 at the pivot 186.

The connecting section 194, 200 of each arm 180, 184 extends downward from the lower arm section 190, 196 and has a lower end which is pivotally connected to a horizontal portion 74a of the third internal support wall 74 such that the arms 180, 184 can only rotate relative to the frame 26. Each upper arm section 192, 198 is mounted within a recess 202, 204 in the lower surface of the die plate 164 and sits on the upper surface of the press plate 42. Each upper arm section 192, 198 has a surface which engages with a surface in the recess 202, 204, such that when the arms 180, 184 are rotated under action of the hydraulic cylinder 168, the die plate 164 moves in an arc motion and generally in a direction normal to the longitudinal axis 54.

In an embodiment, the position sensor assembly 174 is a rotary encoder which has an encoder scale 206 mounted on the rotating connecting section 194 of the front arm 180 and one or more position sensors 208 mounted on the press plate 42. The one or more position sensors 208 is/are coupled to the controller 36 and provides information thereto regarding the rotational position of the front arm 180 relative to the frame 26. The controller 36 processes this information to determine the longitudinal axis position of the piston 168c relative to the housing 168a of the hydraulic cylinder 168, and thus the position of the die plate 164 and die 166 relative to the press plate 42.

The third die assembly 32 which is used to compress the meat product 22 along its length includes a die plate 220 on which a die 222 is mounted, a hydraulic cylinder 224 connected to the die plate 220, a pneumatic cylinder 228 fixedly attached to the die plate 220, and a position sensor assembly 230. The die plate 220 and the die 222 form a third die set. A source of air provides for operation of the pneumatic cylinder 228.

Figure 12:
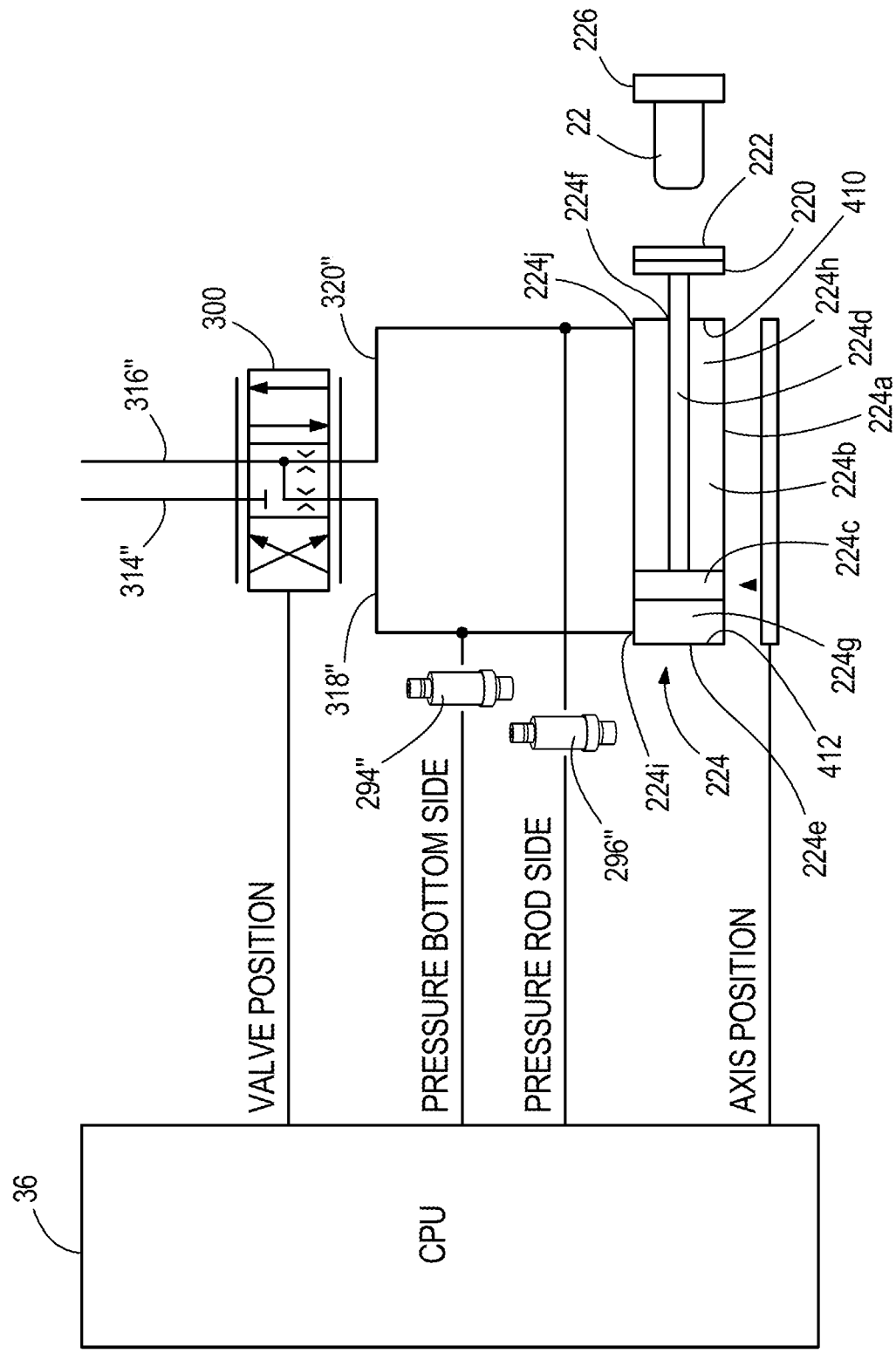

The hydraulic cylinder 224, see FIG. 12, is conventionally formed and includes a housing 224a having a chamber 224b therein in which a piston 224c and a piston rod 224d are seated. The chamber 224b within the housing 224a has a closed end 224e and an opposite end 224f through which the piston rod 224d extends. The piston 224c is within the chamber 224b and separates the chamber 224b into a bottom side chamber 224g and a rod side chamber 224h. A bottom-end port 224i allows hydraulic fluid to flow into or out of the bottom side chamber 224g, and a rod-end port 224j allows hydraulic fluid to flow into or out of the rod side chamber 224h. The hydraulic cylinder 224 is mounted on the upper horizontal support wall 102 in the lower rear compartment 92. The piston rod 224d extends through the rear wall 62 of the upper front compartment 40 above the press plate 42 and is fixedly attached to the die plate 220.

The die plate 220 seats on the upper surface of the press plate 42 and is movable relative to the press plate 42 under action of the hydraulic cylinder 224. The die plate 220 moves along a third press axis 233 which is parallel to the longitudinal axis 54 and is normal to the first and second press axes 153, 177. A variety of shapes of dies 222 may be attached to the die plate 220 to provide different shapes to the ends of the meat product when the meat product is compressed along its length.

The exit gate 56 is longitudinally aligned with the die plate 220.

The pneumatic cylinder 228 is within lower rear compartment 92 above the upper horizontal support wall 102. The pneumatic cylinder 228 extends through the rear wall 62 of the upper front compartment 40 above the press plate 42 and is fixedly attached to the die plate 220. As a result, the pneumatic cylinder 228 moves with the die plate 220. The pneumatic cylinder 228 has a piston rod 228a which is configured to pass through the die plate 220 and extend forwardly thereof, and is connected to the die 222.

The position sensor assembly 230 includes a magnet 234 mounted on the pneumatic cylinder 228, and a linear position sensor 236 mounted on the upper horizontal support wall 102 to the side of the pneumatic cylinder 228. The magnet 234 overlaps the linear position sensor 236. The linear position sensor 236 is coupled to the controller 36 and provides information thereto regarding the linear position of the pneumatic cylinder 228 relative to the frame 26. The controller 36 processes this information to determine the longitudinal axis position of the piston 224c relative to the housing 224a of the hydraulic cylinder 224, and thus the position of the die plate 220 and die 222 relative to the press plate 42.

The press plate 42, the die plates 110, 164, 220, the stop bar 172, and the exit gate 56 define a pressing chamber therebetween.

The lower rear compartment 92 houses the hydraulic system 34 which is actuated under control of the controller 36 to actuate the hydraulic cylinders 114, 168, 224 to cause the form press 20 to operate. The hydraulic system 34 includes a reservoir 280 having a cavity therein which contains hydraulic fluid 281 and air 283, a single pump 282 operated by a single motor 284 for pumping the hydraulic fluid 281 out of the reservoir 280, a manifold 286, a filter 287 between the reservoir 280 and the manifold 286, and a heat exchanger 300. Since only a single pump 282 and single motor 284 are used, the form press 20 only uses a single hydraulic system 34 to operate all three die assemblies 28, 30, 32. The flow divider 298 is conventionally formed and is a mechanically operated pressure valve. The heat exchanger 300 is conventionally formed.

The reservoir 280 may be a tank. The reservoir 280 has a single outlet 306 through which hydraulic fluid is pumped therefrom, through the proportional directional valves 288, 290, 292 in the manifold 286, and then to the hydraulic cylinders 114, 168, 224, and a single inlet 308 through which hydraulic fluid returns from the hydraulic cylinders 114, 168, 224 as described herein.

The hydraulic system 34 also includes a compensator 302 connected to the reservoir 280 having a cavity therein which contains air, and a mechanical air breather 304 connected to the reservoir 280. The compensator 302 is sealed to the reservoir 280. The compensator 302 and the air breather 304 are connected to the reservoir 280, and may be proximate to the outlet 306. The compensator 302 and the air breather 304 are conventionally formed.

A baffle plate 310 is mounted within the reservoir 280 between the outlet 306 and the inlet 308 and divides the internal volume of the reservoir 280. The baffle plate 310 has a plurality of small holes therethrough and may be formed of sheet metal. A diffuser 312 is provided at the inlet 308.

The manifold 286 has proportional directional valves 288, 290, 292 and a flow divider 298 therein. Pressure sensors 294, 296 are provided and monitor the pressure of the hydraulic fluid in the hydraulic cylinder 114. Pressure sensors 294', 296' are provided and monitor the pressure of the hydraulic fluid in the hydraulic cylinder 168. Pressure sensors 294", 296" are provided and monitor the pressure of the hydraulic fluid in the hydraulic cylinder 224. The motor 284 and the proportional directional valves 288, 290, 292 in the manifold 286 are operatively connected to, and are controlled by, the controller 36. Each hydraulic cylinder 114, 168, 224 is connected to its proportional directional valve 288, 290, 292 in the manifold 286 in the same manner.

Figure 16:
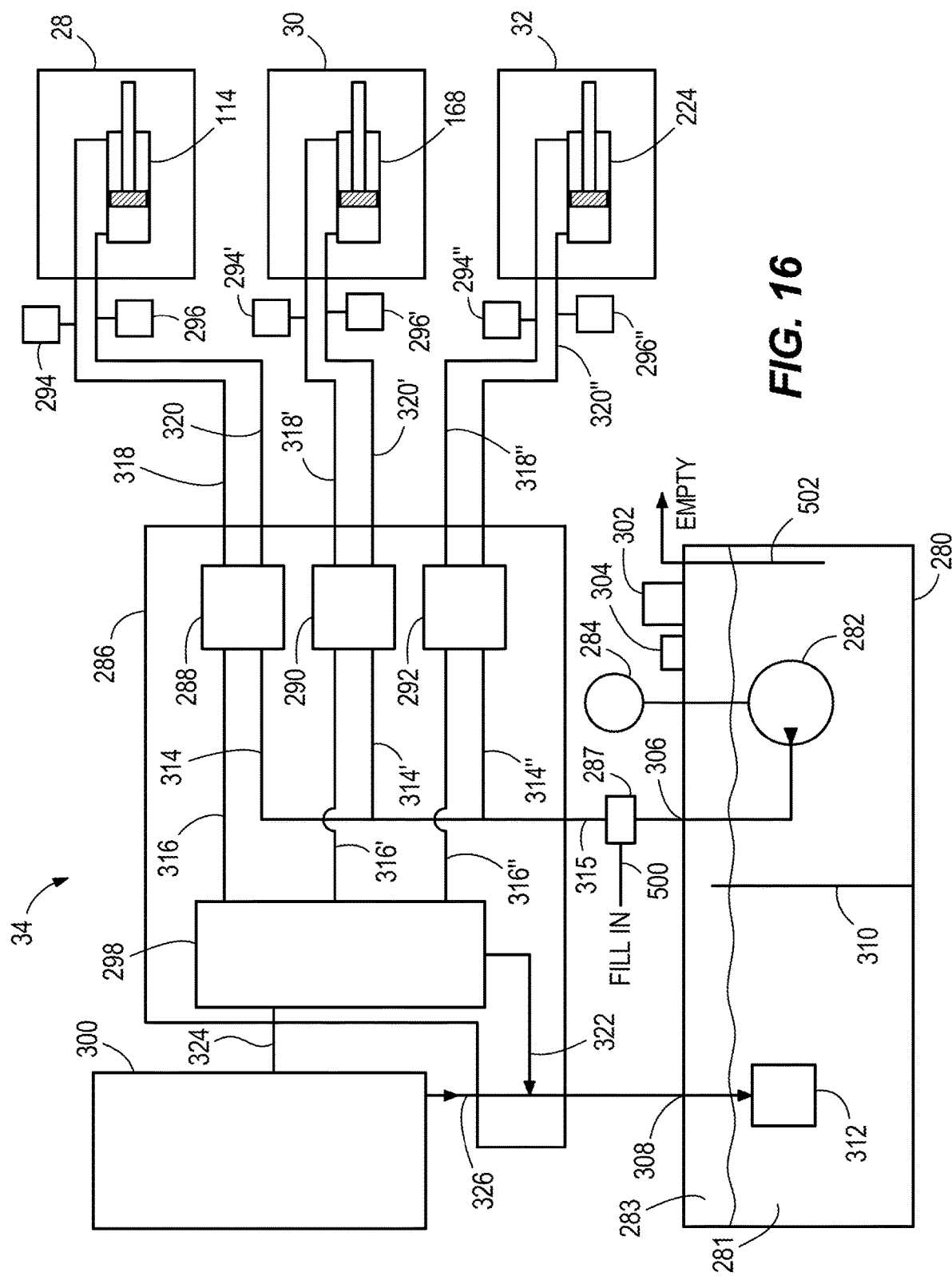
FIG. 16 depicts a schematic representation of a hydraulic system of the form press.

As shown in FIG. 16, a main line 315 is connected to the outlet 306 of the reservoir 280 and connected to an inlet of the manifold 286. The main line 315 branches into three lines 314, 314', 314". Line 314 connects to the proportional directional valve 288 thereby coupling the outlet 306 of the reservoir 280 to the proportional directional valve 288. Line 314' connects to the proportional directional valve 290 thereby coupling the outlet 306 of the reservoir 280 to the proportional directional valve 290. Line 314" connects to the proportional directional valve 292 thereby coupling the outlet 306 of the reservoir 280 to the proportional directional valve 292. Line 314 connects the proportional directional valve 288 to the flow divider 298; line 314' connects the proportional directional valve 290 to the flow divider 298; line 314" connects the proportional directional valve 292 to the flow divider 298.

A line 318 connects the proportional directional valve 288 to the bottom side chamber 114g of the chamber 114b. The line 318 has a pressure sensor 294 which measures the pressure on the bottom side chamber 114g of the chamber 114b. A line 320 connects the proportional directional valve 288 to the rod side chamber 114h of the chamber 114b. The line 320 has a pressure sensor 296 which measures the pressure on the rod side chamber 114h of the chamber 114b. Each pressure sensor 294, 296 is coupled to the controller 36, and information from each pressure sensor 294, 296 is communicated to the controller 36.

A line 318' connects the proportional directional valve 290 to the bottom side chamber 168g of the chamber 168b. The line 318' has a pressure sensor 294' which measures the pressure on the bottom side chamber 168g of the chamber 168b. A line 320' connects the proportional directional valve 290 to the rod side chamber 168h of the chamber 168b. The line 320' has a pressure sensor 296' which measures the pressure on the rod side chamber 168h of the chamber 168b. Each pressure sensor 294', 296' is coupled to the controller 36, and information from each pressure sensor 294', 296' is communicated to the controller 36.

A line 318" connects the proportional directional valve 292 to the bottom side chamber 224g of the chamber 224b. The line 318" has a pressure sensor 294" which measures the pressure on the bottom side chamber 224g of the chamber 224b. A line 320" connects the proportional directional valve 292 to the rod side chamber 224h of the chamber 224b. The line 320" has a pressure sensor 296" which measures the pressure on the rod side chamber 224h of the chamber 224b. Each pressure sensor 294", 296" is coupled to the controller 36, and information from each pressure sensor 294", 296" is communicated to the controller 36.

A line 322 connects a first outlet of the flow divider 298 to the inlet 308 of the reservoir 280. A line 324 connects a second outlet of the flow divider 298 to an inlet of the heat exchanger 300. An outlet of the heat exchanger 300 connects to the line 322.

Each line may be provided by a hydraulic hose.

Figure 13A:
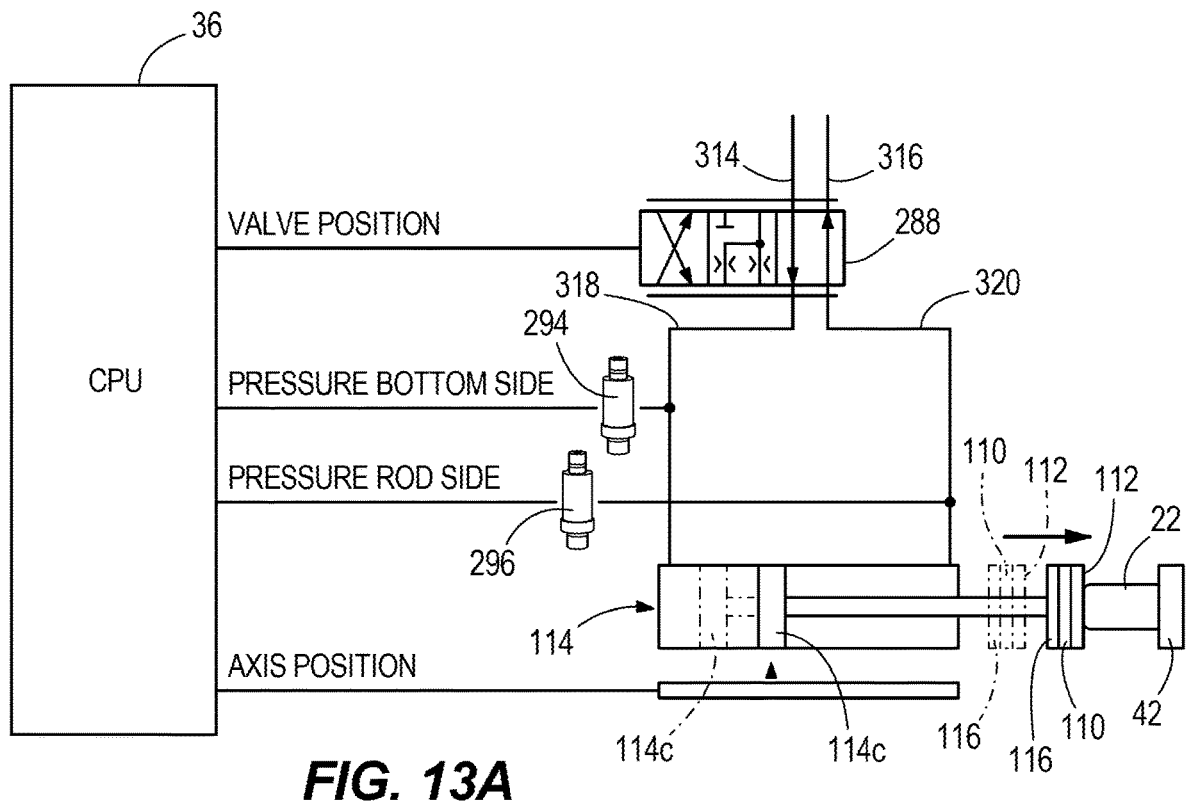
FIGS. 13A-13C depict schematic representations showing the components of FIG. 10 in various positions.
Figure 13B:
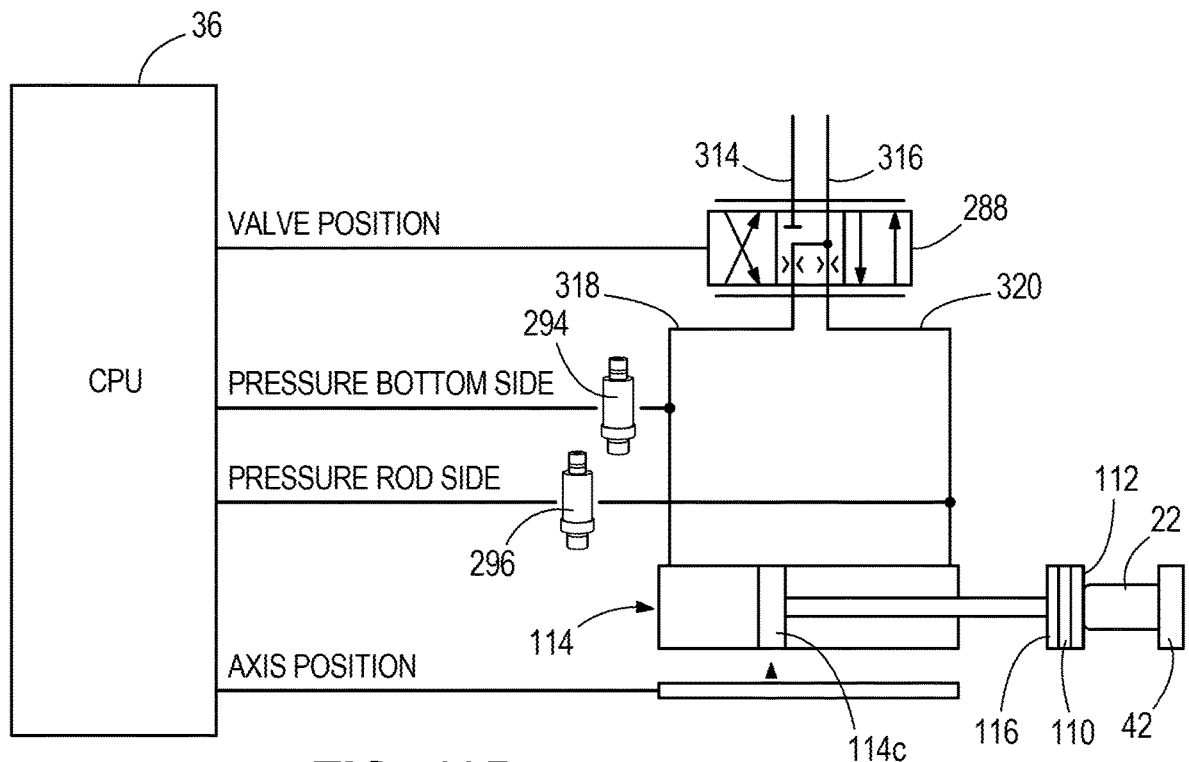
Figure 13C:
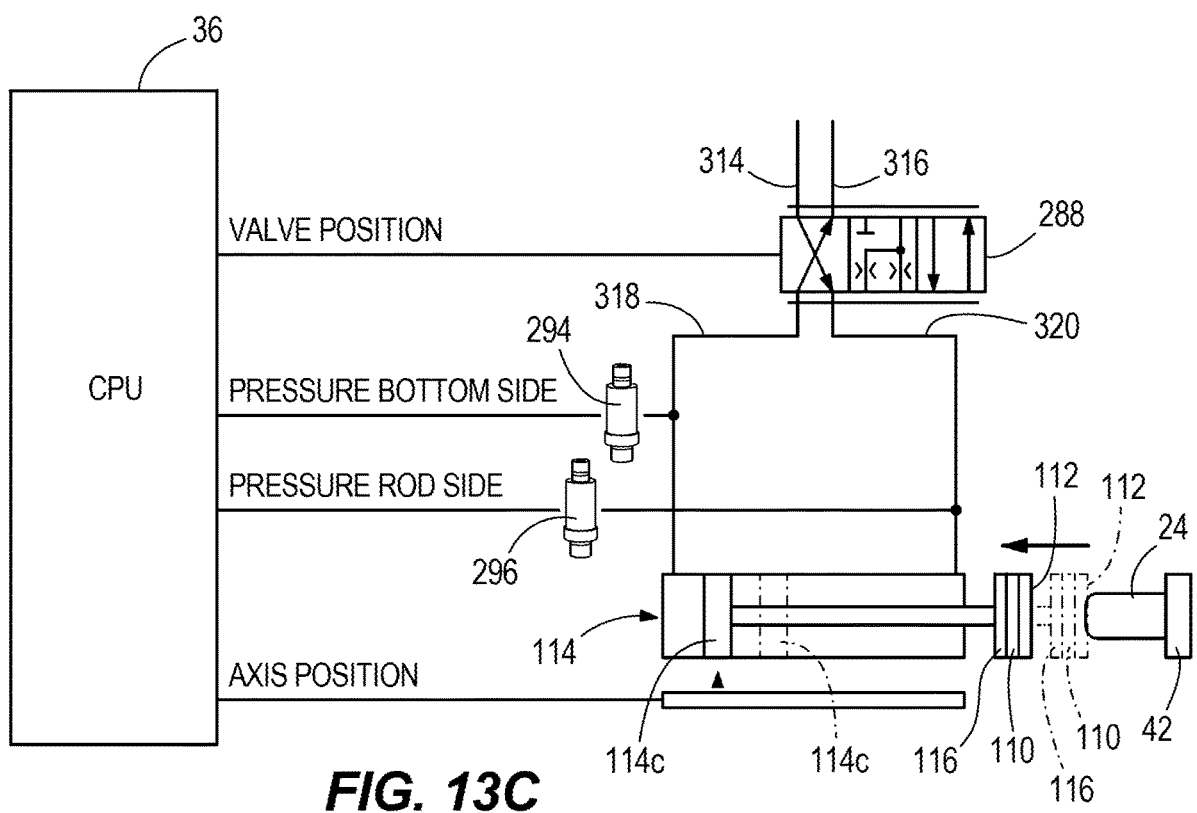
Figure 14:
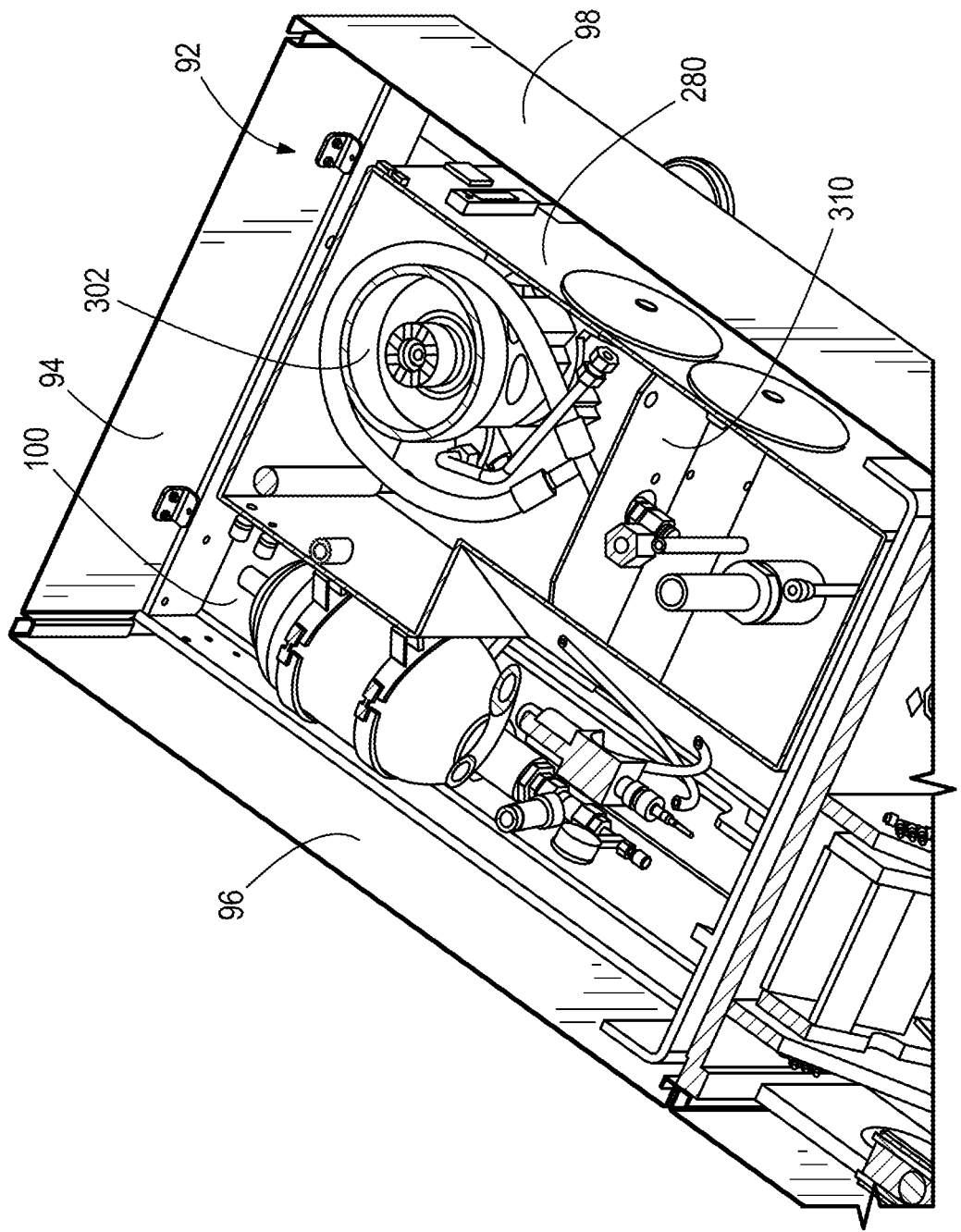
FIG. 14 depicts a partial cross-section view shown in perspective of the form press through a reservoir mounted on the form press.
Figure 15:
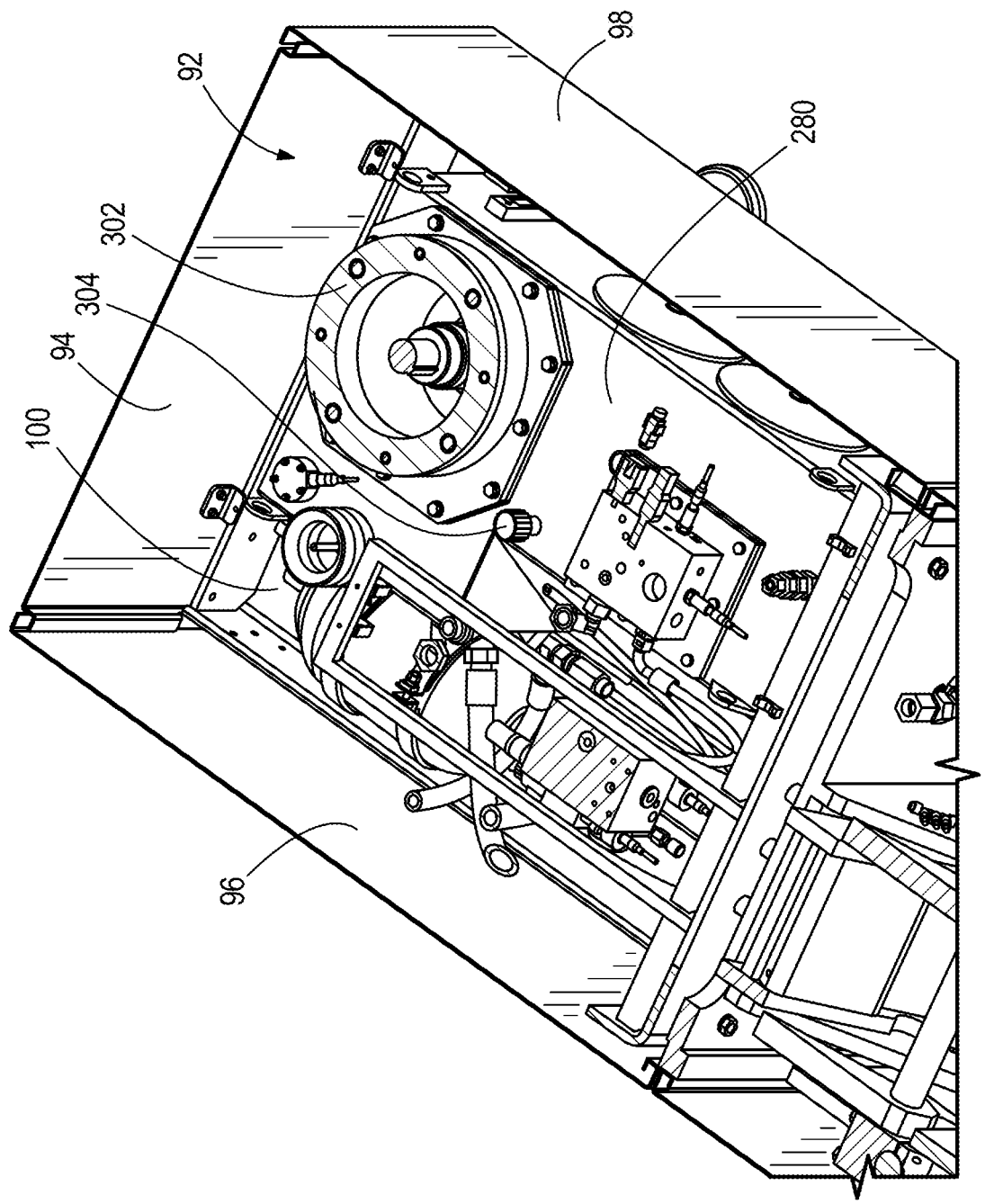
FIG. 15 depicts a partial cross-section view shown in perspective of the form press above the reservoir.

Each proportional directional valve 288, 290, 292 can be positioned in a variety of positions under control of the controller 36. FIGS. 13A-13C illustrate example positions of the proportional directional valve 288 and its related components for simplicity in illustration and description, with the understanding that the other hydraulic cylinders 168, 224 can be positioned in these example positions as well. In a central, neutral position as shown in FIGS. 10 and 13B, the hydraulic fluid flows from the rod side chamber 260 to the bottom side chamber 262, or the hydraulic fluid flows from the bottom side chamber 262 to the rod side chamber 260. In a first position as shown in FIG. 13A, the hydraulic fluid flows from the pump 282, through the line 314, through the proportional directional valve 288, through the line 320 and into the bottom side chamber 262, and hydraulic fluid flows from the rod side chamber 260, through the line 318, through the proportional directional valve 288, through the line 316 and into the reservoir 280. In a second position as shown in FIG. 13C, the hydraulic fluid flows from the pump 282, through the line 314, through the proportional directional valve 288, through the line 318 and into the rod side chamber 260, and hydraulic fluid flows from the bottom side chamber 262, through the line 320, through the proportional directional valve 288, through the line 316 and into the reservoir 280. When the proportional directional valves 288, 290, 292 are in the first or second positions, the proportional directional valves 288, 290, 292 may be fully opened, or may be partially open (greater than 0% open but less than 100% open).

The controller 36 can include a memory for storing data received from the position sensor assemblies 118, 174, 230 and the pressure sensors 294, 296, 294', 296', 294", 296" and a processor configured to process information received from the position sensor assemblies 118, 174, 230 and the pressure sensors 294, 296, 294', 296', 294", 296". In some example embodiments, the memory may include non-transitory memory. The memory can store data and instructions (e.g., compiled executable program instructions, uncompiled program code, some combination thereof, or the like), which when performed (e.g., executed, translated, interpreted, and/or the like) by the processor, causes the processor to perform the processes described herein.

Figure 9:
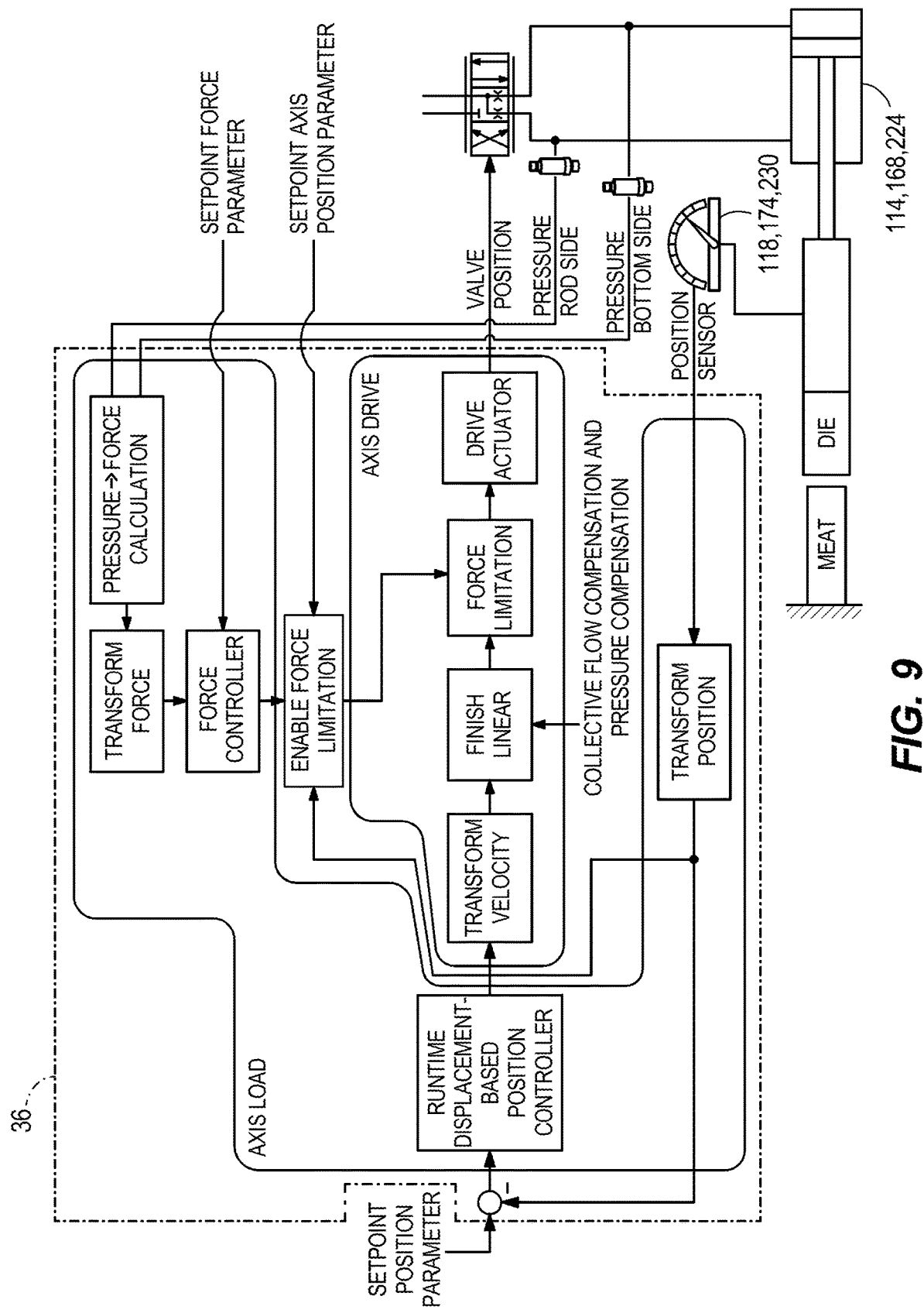
FIG. 9 depicts a schematic representation of a controller of the form press.

FIG. 9 shows a schematic representation of the controller 36 which uses a closed loop system to attain proper pressing of the meat product 22, and FIGS. 17-22 show an embodiment of an operation of the form press 20 to press form the meat product 22 into a block of meat 24.

When the form pressing is being performed by each die assembly 28, 30, 32 to form press the meat product 22, it is desired that each die assembly 28, 30, 32 is moved to a predetermined press position as measured by the position sensor assembly 118, 174, 230 under position control, with a force being exerted on the die 112, 166, 222 that does not exceed a predetermined force value as measured by the pressure sensors 294, 296, 294', 296', 294", 296". The predetermined press position is measured along the first press axis 153 as the axial distance between the die 112 and the press plate 42, is measured along the second press axis 177 as the axial distance between the die 166 and the stop bar 172, and is measured along the third press axis 233 and the exit gate 56. The press plate 42, the stop bar 172 and the exit gate 56 are herein defined as end points for ease in description.

The form press 20 initially operates under position control, and when the die 112, 166, 222 reaches a predetermined axial position along its movement relative to the end point, the form press 20 switches to force/position control. When the form press 20 is operating under position control, the form press 20 moves without regard to the pressure values being sensed by the pressure sensors 294, 296, 294', 296', 294", 296". When the form press 20 is operating under force/position control, the die assembly 28, 30, 32 is moved taking into account the pressure values being sensed by the pressure sensors 294, 296, 294', 296', 294", 296", but subject to the die assembly 28, 30, 32 not moving further than the predetermined press position. This provides for a closed loop system since parameters are actively measured and fed back to the controller 36.

When the form pressing is being performed by each die assembly 28, 30, 32 to form press the meat product 22, the controller 36 has a setpoint position parameter set for each press axis 153, 177, 233 which represents the predetermined press position for that press axis 153, 177, 233. The controller 36 also has a setpoint force parameter set for each press axis 153, 177, 233 which represents the predetermined force value for that press axis 153, 177, 233. A setpoint axis position parameter is also set within the controller 36 for each press axis 153, 177, 233, which represents the predetermined axial position that the die 112, 166, 222 relative to the end point that the die 112, 166, 222 is to reach when the control of the movement switches from position control to force/position control.

When a meat product 22 is within the press chamber, the top of the meat product 22 is at an axial distance away from the press plate 42, the side of the meat product 22 which is pressed by the second die assembly 30 is at an axial distance away from the stop bar 172, and the rear end of the meat product 22 is at an axial distance away from the exit gate 56. The setpoint axis position parameter for the height is set to a value which is expected to be greater than the axial distance that a top of the meat product 22 is from the press plate 42 (since heights of meat products 22 vary the setpoint axis position parameter may not always be greater). The setpoint axis position parameter for the width is set to a value which is expected to be greater than the axial distance that a side of meat product 22 is from the stop bar 172 (since widths of meat products 22 vary the setpoint axis position parameter may not always be greater). The setpoint axis position parameter for the length is set to a value which is expected to be greater than the axial distance that an end of meat product 22 is from the stop bar 172 (since lengths of meat products 22 vary the setpoint axis position parameter may not always be greater).

When the form pressing is being performed by each die assembly 28, 30, 32 to form press the meat product 22, the press cycle for each die assembly 28, 30, 32 starts under position control by first moving the die 112, 166, 222 forward with monitoring by the position sensor assembly 118, 174, 230. The die assembly 28, 30, 32 moves very quickly under position control. When the position sensor assembly 118, 174, 230 senses that the die 112, 166, 222 meets the setpoint axis position parameter, the form press 20 switches on the fly to force/position control. When the die 112, 166, 222 engages with the meat product 22, the load force on the die 112, 166, 222 increases as indicated by the pressure sensors 294, 296, 294', 296', 294", 296". The controller 36 operates the proportional directional valve 288, 290, 292 to reduce the flow of the hydraulic fluid into the bottom side chamber 114g, 168g, 224g to slow the forward movement of the die 112, 166, 222, increase the flow of the hydraulic fluid into the bottom side chamber 114g, 168g, 224g to speed up the forward movement of the die 112, 166, 222, stop flow to the hydraulic cylinder 114, 168, 224, or reverse the flow of the hydraulic fluid to the bottom side chamber 114g, 168g, 224g to reverse the movement of the die 112, 166, 222. The form press 20 continues to move the die 112, 166, 222 under force/position control until the die 112, 166, 222 is either moved to the predetermined press position or the pressure in the hydraulic cylinder 114, 168, 224 exceeds the setpoint force parameter, at which point movement of the die 112, 166, 222 is stopped. This provides for a very fast and accurate pressing of the meat product 22 without the overpressing of the meat product 22.

Figure 17:
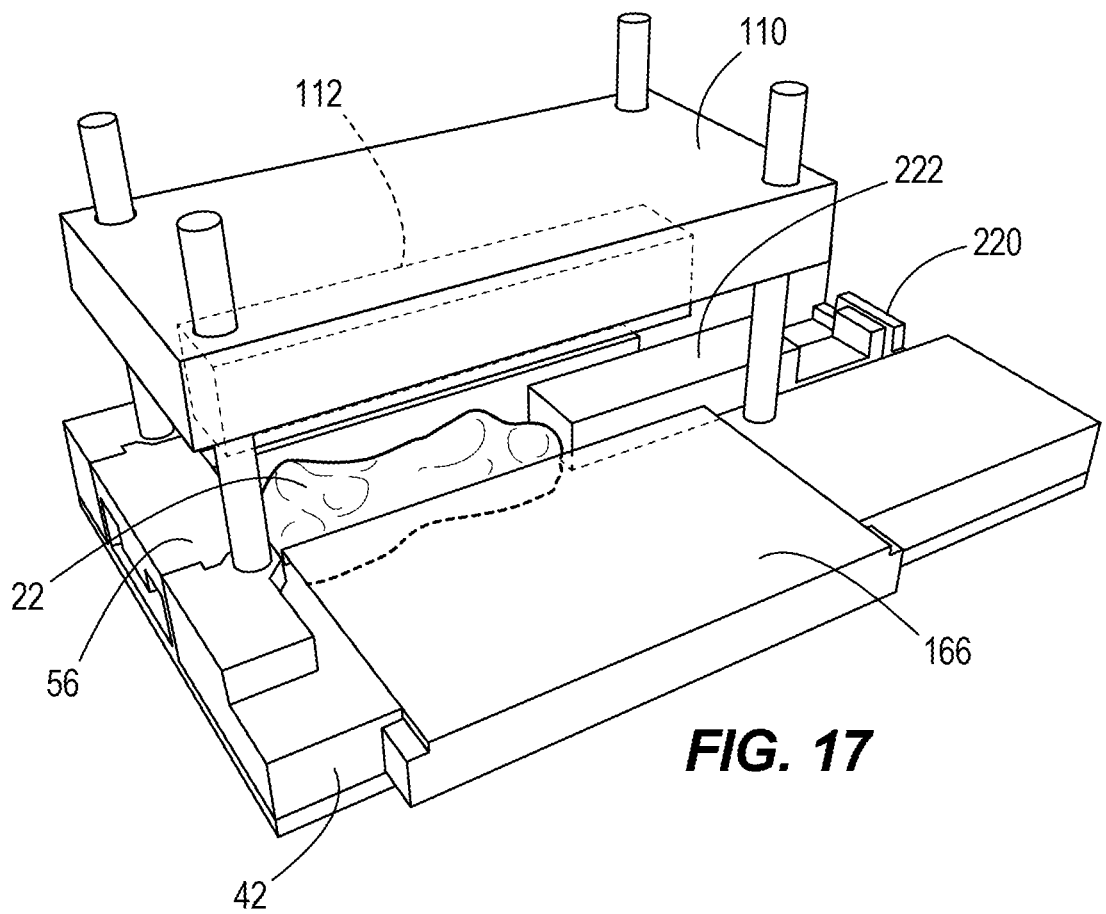
FIGS. 17-22 are schematic representations showing the form pressing of a meat product in accordance with an embodiment of the disclosure.
Figure 18:
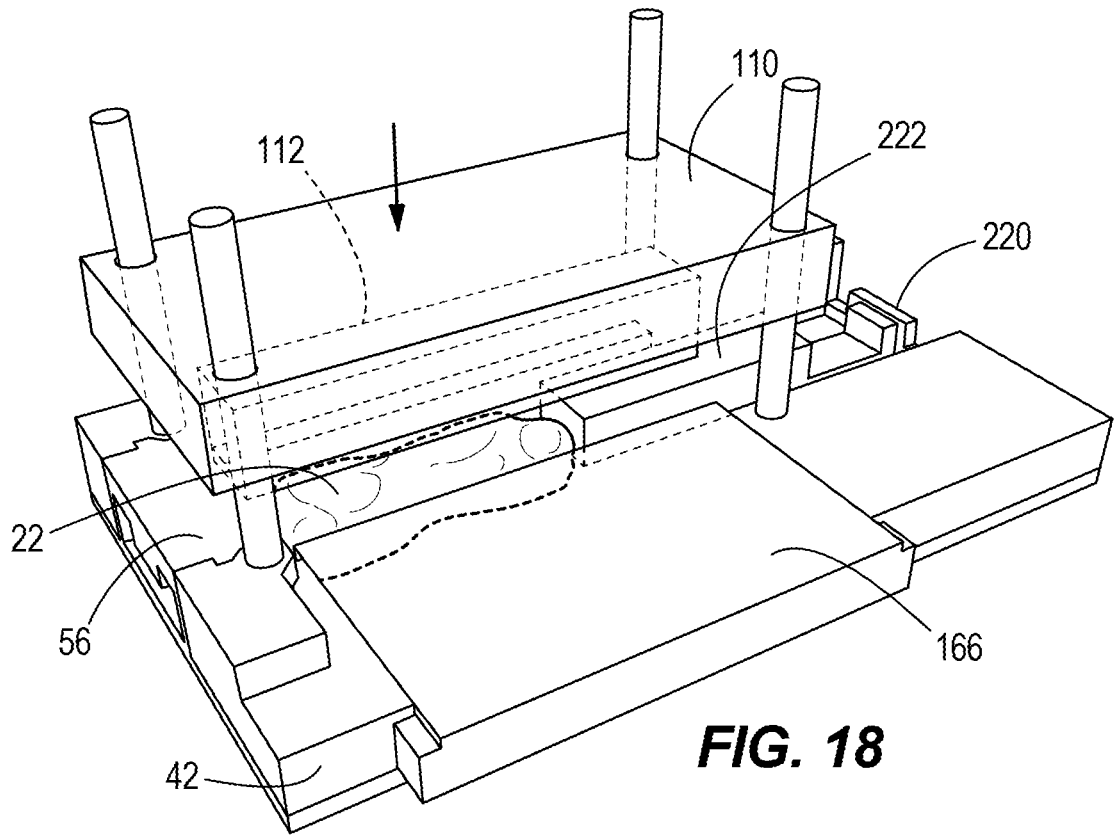
Figure 19:
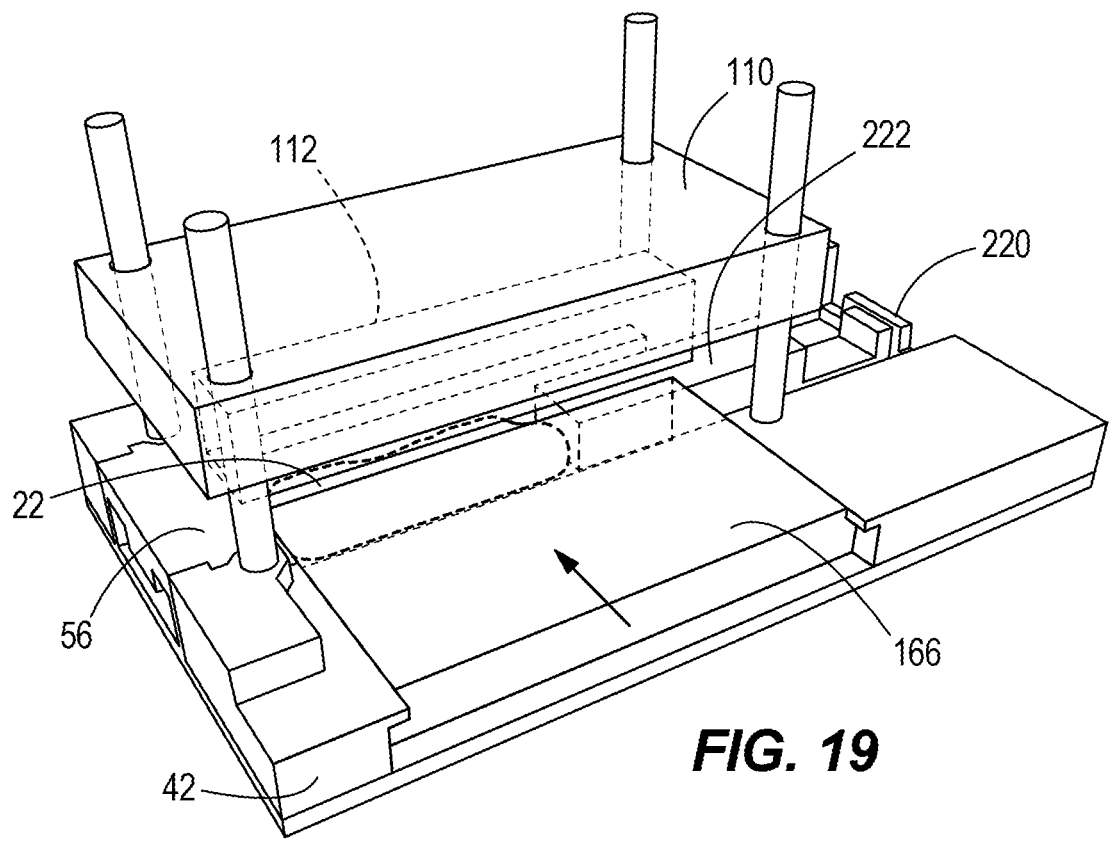
Figure 20:
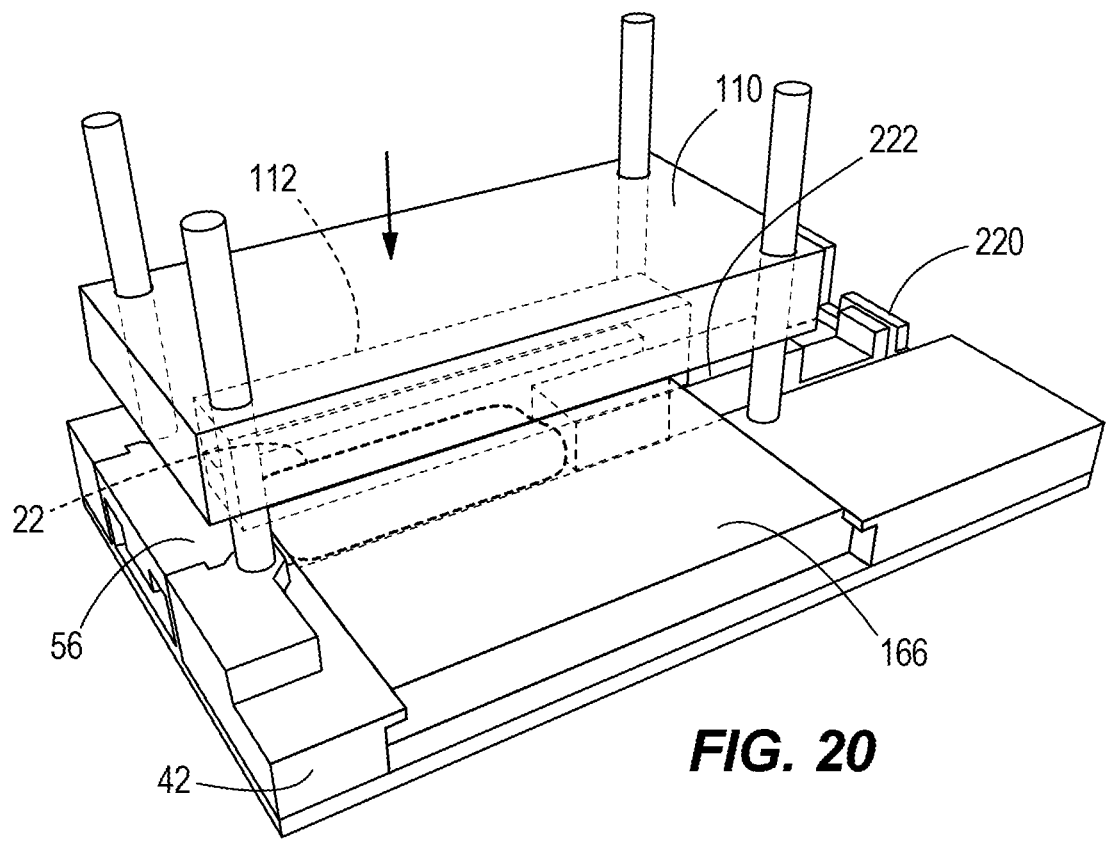
Figure 21:
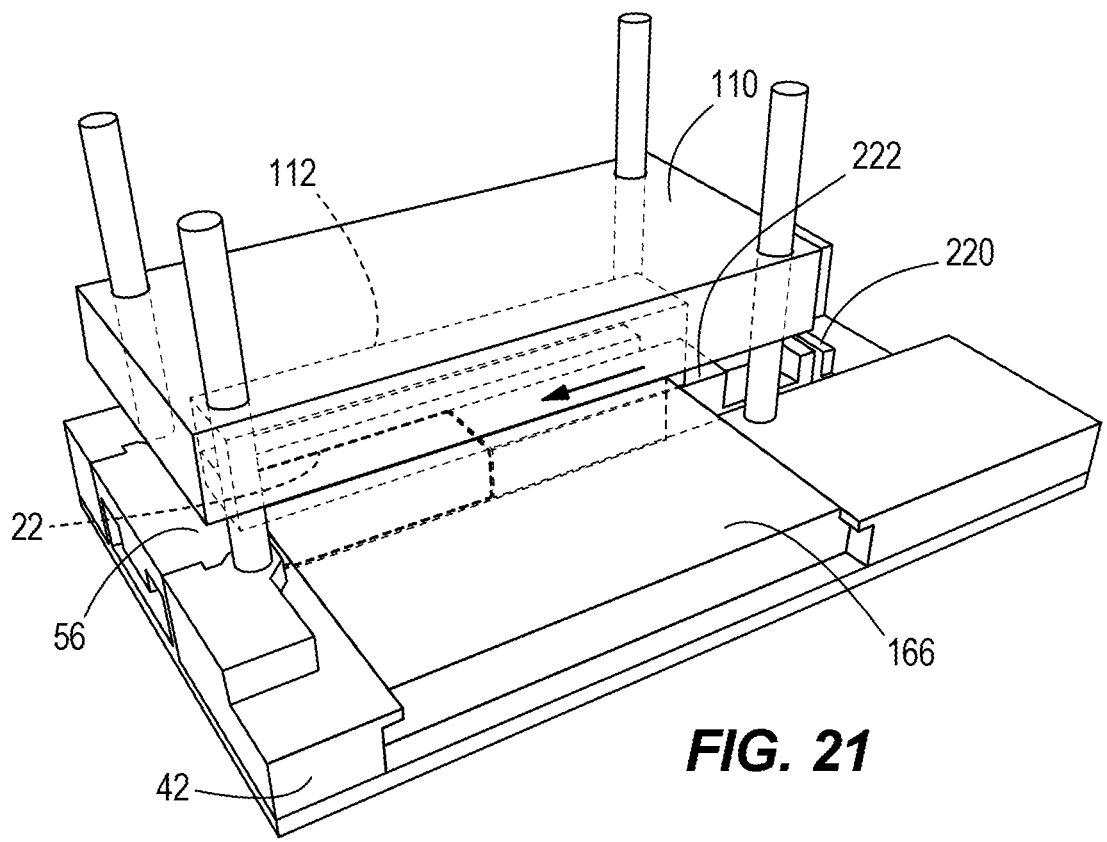
Figure 22:
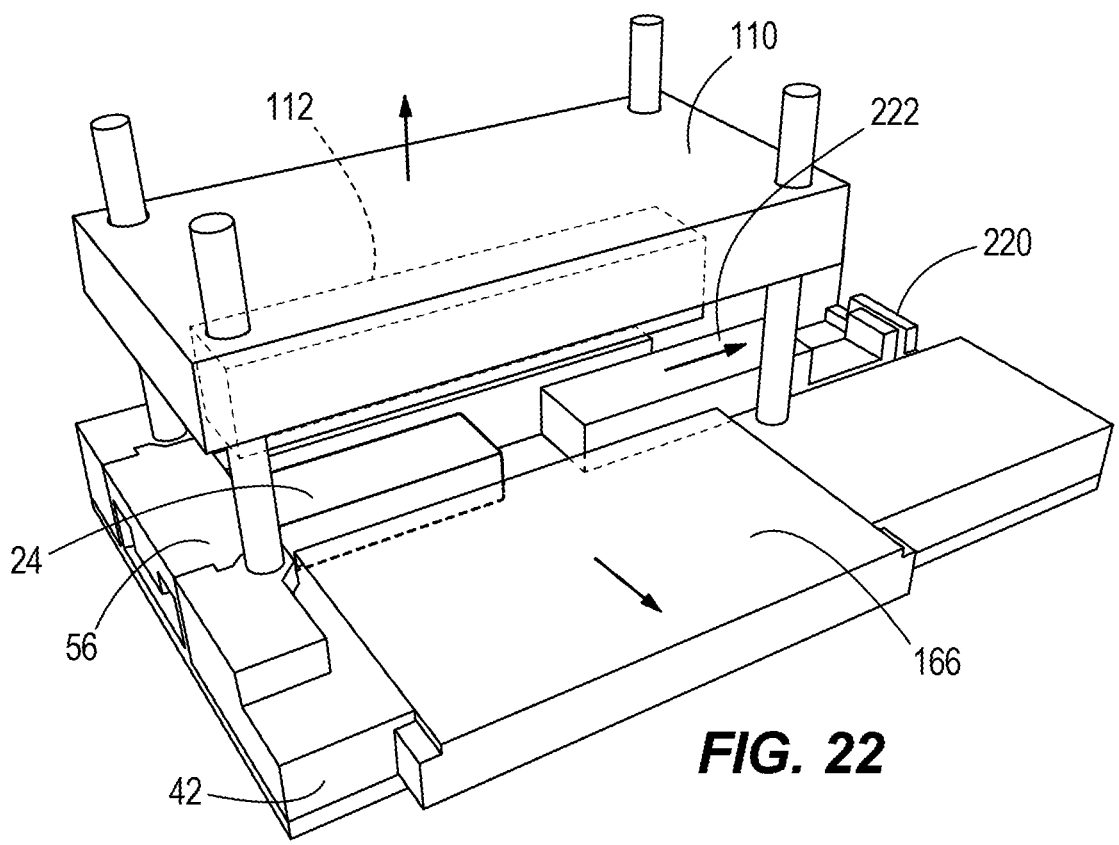

As shown in in FIG. 17, the meat product 22 is placed onto the press plate 42 in the press chamber. The first die assembly 28 is activated under control of the controller 36. The proportional directional valve 288 is positioned such that hydraulic fluid flows into the bottom side chamber 114g to extend the piston rod 114d of the hydraulic cylinder 114. Upon extension of the piston rod 114d, the bar 120 is moved longitudinally through the upper front compartment 40 toward the front wall 60. This causes the arms 122a, 122b, 128a, 128b to scissor which causes the blocks 124a, 124b, 130a, 130b and draw bars 126a, 126b, 132a, 132b to move vertically downward along the first press axis 153. The die plate 110 and attached die 112 then move vertically downward along the first press axis 153. The die 112 engages the top surface of the meat product 22 and sandwiches the meat product 22 between the die 112 and the press plate 42, thereby compressing the meat product 22 along its height when sufficient pressure is applied to the top surface.

The first die assembly 28 is moved with the position sensor assembly 118 sending positional information regarding the linear position of the block 124a relative to the frame 26 to the controller 36 and with the pressure sensors 294, 296 sending pressure information regarding the hydraulic cylinder 114 to the controller 36. The position sensor assembly 118 provides the controller 36 with information to determine the longitudinal axis position of the piston 114c relative to the housing 114a of the hydraulic cylinder 114, and thus the position of the die plate 110 and die 112 relative to the press plate 42. As the first die assembly 28 is being moved to the predetermined press position under position control, once the die 112 reaches the axial position which corresponds to the setpoint axis position parameter, the controller 36 switches to force/position control. The die 112 may have already engaged with the meat product 22 or may not have engaged with the meat product 22. Once the die 112 engages with the meat product 22, the force against the die 112 increases since the meat product 22 presses against the die 112, which causes pressure to build in the rod side chamber 114h. The pressing continues until the setpoint force parameter has been reached or the predetermined press position is reached, at which point the controller 36 prevents flow through proportional directional valve 288 to maintain the current position of the die 112. This allows for the die 112 to be quickly moved into place using the axis position of the piston 114c, with a controlled application of pressure thereafter by the hydraulic cylinder 114 by monitoring the pressures in hydraulic cylinder 114.

Thereafter, the second die assembly 30 is activated under control of the controller 36. The proportional directional valve 290 is positioned such that hydraulic fluid flows into the bottom side chamber 168g to extend the piston rod 168d of the hydraulic cylinder 168. Upon extension of the piston rod 168d of the hydraulic cylinder 168, the bar 178 is moved generally longitudinally toward the front wall 60. This causes the arms 180, 184 to rotate relative to the horizontal portion 74a of the third internal support wall 74 which causes the die plate 164 and attached die 166 to move in an arc motion toward the stop bar 172 along the second press axis 177. The die plate 164 and attached die 166 then move normal to the longitudinal axis 55 along the second press axis 177. The die 166 engages the side surface of the meat product 22 and sandwiches the meat product 22 between the die 112 and the stop bar 172, thereby compressing the meat product 22 along its width when sufficient pressure is applied to the side surface.

The second die assembly 30 is moved with the position sensor assembly 174 sending positional information regarding the rotational position of the connecting section 194 relative to the frame 26 to the controller 36 and with the pressure sensors 294', 296' sending pressure information regarding the hydraulic cylinder 168 to the controller 36. The position sensor assembly 174 provides the controller 36 with information to determine the longitudinal axis position of the piston 168c relative to the housing 168a of the hydraulic cylinder 168, and thus the position of the die plate 164 and die 166 relative to the stop bar 172. As the second die assembly 30 is being moved to the predetermined press position under position control, once the die 166 reaches the axial position which corresponds to the setpoint axis position parameter, the controller 36 switches to force/position control. The die 166 may have already engaged with the meat product 22 or may not have engaged with the meat product 22. Once the die 166 engages with the meat product 22, the force against the die 166 increases since the meat product 22 presses against the die 166, which causes pressure to build in the rod side chamber 168h. The pressing continues until setpoint force parameter has been reached or the predetermined press position is reached, at which point the controller 36 prevents flow through proportional directional valve 290 to maintain the current position of the die 166. This allows for the die 166 to be quickly moved into place using the axis position of the piston 168c, with a controlled application of pressure thereafter by the hydraulic cylinder 168 by monitoring the pressures in hydraulic cylinder 168.

When the die 166 of the second die assembly 30 starts to press upon the meat product 22, this causes the meat product 22 to deform in its height and length directions. Since the die 112 is engaged with the top surface of the meat product 22 and since the proportional directional valve 288 is positioned to prevent flow therethrough, when the meat product 22 presses against the die 112, the hydraulic fluid within the bottom side chamber 114g of the hydraulic cylinder 114 initially compresses to move the die 112 upward. When the pressure in the bottom side chamber 114g exceeds the force value parameter as sensed by the pressure sensor 294, the proportional directional valve 288 is repositioned to allow fluid to flow out of the bottom side chamber 114g, to relieve pressure within the hydraulic cylinder 114. The die 166 of the second die assembly 30 may have an expandable feature to take up any gap that is formed when the die 112 moves upward. When the setpoint force parameter is again reached, the proportional directional valve 288 is again repositioned to allow flow therethrough and into the bottom side chamber 114g until the setpoint force parameter has been reached or the predetermined press position is reached, at which point the controller 36 prevents flow through proportional directional valve 288 to maintain the current position of the die 112.

After the first and second die assemblies 28, 30 have moved to the current positions, the third die assembly 32 is activated under control of the controller 36 to form press the meat product 22 along its length. The proportional directional valve 292 is positioned such that hydraulic fluid flows into the bottom side chamber 224g to extend the piston rod 224d of the hydraulic cylinder 224. Upon extension of the piston rod 224d of the hydraulic cylinder 224, the die plate 220, attached die 222 and the pneumatic cylinder 228 are moved longitudinally through the upper front compartment 40 and toward the exit gate 56 along the third press axis 233. The die 222 engages the rear surface of the meat product 22 and sandwiches the meat product 22 between the die 112 and the exit gate 56, thereby compressing the meat product 22 along its length when sufficient pressure is applied to the rear surface.

The third die assembly 32 is moved with the position sensor assembly 230 sending positional information regarding the linear position of the pneumatic cylinder 228 relative to the frame 26 to the controller 36 and with the pressure sensors 294", 296" sending pressure information regarding the hydraulic cylinder 224 to the controller 36. The position sensor assembly 230 provides the controller 36 with information to determine the longitudinal axis position of the piston 224c relative to the housing 224a of the hydraulic cylinder 224, and thus the position of the die plate 220 and die 222 relative to the exit gate 56. As the third die assembly 32 is being moved to the predetermined press position under position control, once the die 222 reaches the axial position which corresponds to the setpoint axis position parameter, the controller 36 switches to force/position control. The die 222 may have already engaged with the meat product 22 or may not have engaged with the meat product 22. Once the die 222 engages with the meat product 22, the force against the die 222 increases since the meat product 22 presses against the die 222, which causes pressure to build in the rod side chamber 224*h*. The pressing continues until the setpoint force parameter has been reached or the predetermined press position is reached, at which point the controller 36 prevents flow through proportional directional valve 292 to maintain the current position of the die 222. This allows for the die 222 to be quickly moved into place using the axis position of the piston 224*c*, with a controlled application of pressure thereafter by the hydraulic cylinder 224 by monitoring the pressures in hydraulic cylinder 224.

While the pressing is occurring along the third press axis 233, this causes the meat product 22 to deform in its height and width directions which will cause the meat product 22 to press against the dies 112, 166.

Since the die 112 is engaged with the top surface of the meat product 22 and since the proportional directional valve 288 is positioned to prevent flow therethrough, when the meat product 22 presses against the die 112, the hydraulic fluid within the bottom side chamber 114*g* of the hydraulic cylinder 114 initially compresses to move the die 112 upward. When the pressure in the bottom side chamber 114*g* exceeds the force value parameter as sensed by the pressure sensor 294, the proportional directional valve 288 is repositioned to allow fluid to flow out of the bottom side chamber 114*g*, to relieve pressure within the hydraulic cylinder 114. When the setpoint force parameter is again reached, the proportional directional valve 288 is again repositioned to allow flow therethrough and into the bottom side chamber 114*g* until the setpoint force parameter has been reached or the predetermined press position is reached, at which point the controller 36 prevents flow through proportional directional valve 288 to maintain the current position of the die 112. Likewise, since the die 166 is engaged with the side surface of the meat product 22 and since the proportional directional valve 290 is positioned to prevent flow therethrough, when the meat product 22 presses against the die 166, the hydraulic fluid within the bottom side chamber 168*g* of the hydraulic cylinder 168 initially compresses to move the die 166 outward. When the pressure in the bottom side chamber 168*g* exceeds the force value parameter as sensed by the pressure sensor 294, the proportional directional valve 290 is repositioned to allow fluid to flow out of the bottom side chamber 168*g*, to relieve pressure within the hydraulic cylinder 168. When the setpoint force parameter is again reached, the proportional directional valve 290 is again repositioned to allow flow therethrough and into the bottom side chamber 168*g* until the setpoint force parameter has been reached or the predetermined press position is reached, at which point the controller 36 prevents flow through proportional directional valve 290 to maintain the current position of the die 166. The die 222 may have an expandable feature to take up any gap that is formed when the die 112 moves upward and the die 166 moves outward.

This continuous movement of the proportional directional valves 288, 290, 292 may continue until the press chamber is fully closed to form the block of meat 24. When fully closed, the dies 112, 166, 222 are engaged with each other. This prevents the leaking of any meat product 22 from the press chamber. As such, the press chamber in its closed position provides for a zero gap between the dies 112, 166, 222.

In an embodiment, if any of the current positions of the dies 112, 166, 222 are sensed by the position sensor assembly 118, 174, 230 to not be at the predetermined press position, then the controller 36 issues a warning to the operator that an incomplete pressing has occurred.

FIG. 9 shows a schematic representation of the controller 36. In FIG. 9, the SETPOINT POSITION PARAMETER is a value set in the controller 36 for each press axis 153, 177, 233 which represents the predetermined press position for that press axis 153, 177, 233 as described hereinabove. In FIG. 9, the SETPOINT FORCE PARAMETER is a value set in the controller 36 for each press axis 153, 177, 233 which represents the predetermined force value for that press axis 153, 177, 233 as described hereinabove. In FIG. 9, the SETPOINT AXIS POSITION PARAMETER is a value set in the controller 36 for each press axis 153, 177, 233 which represents the predetermined axial position that the die 112, 166, 222 relative to the end point that the die 112, 166, 222 is to reach when the control of the movement switches from position control to force/position control as described hereinabove.

The TRANSFORM POSITION block represents the step where a mathematical function converts the position measurements from the position sensor assemblies and converts the position measurements into a value representative of the distance the particular die is away from its end point. These two values are compared and the difference is calculated and input into the RUNTIME DISPLACEMENT BASED UPON POSITION CONTROL block which represents the step where the calculation as to how fast the hydraulic cylinder should move is performed. This value is input into the TRANSFORM VELOCITY block which represents the step where a mathematical function uses the input value and calculates how much the valve should open. This value is input into the FINISH LINEAR block which represents the step where this value is used and limits this value depending upon a COLLECTIVE FLOW COMPENSATION AND PRESSURE COMPENSATION value, and provides a limited output value. The COLLECTIVE FLOW COMPENSATION is the sum of the amount of fluid that the hydraulic cylinders are using, and the PRESSURE COMPENSATION measures pressure at the output of the pump. This is input into the FORCE LIMITATION block which is only active if the controller 36 is operating under force/position control. If not acting under force/position control, the FORCE LIMITATION block does not alter the value of the output of the FINISH LINEAR block. The output from the FORCE LIMITATION block is input into the DRIVE ACTUATOR block which represents the step where the position where the valve should be is calculated, so that the valve is moved to the new position. The SETPOINT POSITION PARAMETER, the TRANSFORM POSITION block, the RUNTIME DISPLACEMENT BASED UPON POSITION CONTROL block, the TRANSFORM VELOCITY block, the FINISH LINEAR block, the COLLECTIVE FLOW COMPENSATION AND PRESSURE COMPENSATION value, the FORCE LIMITATION block, the DRIVE ACTUATOR block are used to operate the form press 20 under position control.

The pressure values from the pressure sensors are continuously input into the PRESSURE→FORCE CALCULATION block which represents the step where the pressure difference from the pressure sensor values are calculated so as to calculate the force on the particular hydraulic cylinder.

The TRANSFORM FORCE block represents the step where a mathematical function converts the force on the particular hydraulic cylinder to the force on the die. The FORCE CONTROLLER block represents a step where the force on the die is compared with the SETPOINT FORCE PARAMETER and this value is output to the ENABLE FORCE LIMITATION block. The ENABLE FORCE LIMITATION block represents a step where the value output from the FORCE CONTROLLER block is compared with the SETPOINT AXIS POSITION PARAMETER. If this value exceeds the SETPOINT AXIS POSITION PARAMETER, this value is input into the FORCE LIMITATION block. The FORCE LIMITATION then provides a limited output value which is input into the DRIVE ACTUATOR block which calculates the position where the valve should be so that the valve is moved. These blocks are additionally used to perform force/position control of the form press 20.

This is continuously performed for all three press axes 153, 177, 233.

In an embodiment, as a result of the geometry of the linkages 116, 170, each of the first and second die assemblies 28, 30 is a nonlinear system wherein the movement of the die 112, 166 is not proportional to the movement of the piston rod 114d, 168d, and the third die assembly 32 is a linear system wherein the movement of the die 222 is proportional to the movement of the piston rod 224d.

While the first and second die assemblies 28, 30 are shown with linkages 116, 170, the first and second die assemblies 28, 30 could take the same form as the first die assembly 32.

While FIGS. 17-22 show the first die assembly 28 first being engaged and the second die assembly 30 thereafter engaged, in an embodiment, the second die assembly 30 is engaged prior engagement of the first die assembly 28.

After the pressing has been completed, the controller 36 activates the first and second die assemblies 28, 30 to disengage from the block of meat 24 and move to their initial positions. This reverse movement is performed under position control using the position sensor assemblies 118, 174 to monitor the position of the dies 112, 166 relative to the press plate 42. The controller 36 thereafter opens the exit gate 56, and activates the pneumatic cylinder 228 to quickly extend its piston rod 228a and eject the block of meat 24 through the open exit gate 56. Thereafter, the piston rod 228a is retracted and the exit gate 56 is closed. The controller 36 activates the third die assembly 32 to move back to its initial position. This reverse movement is performed under position control using the position sensor assembly 230 to monitor the position of the die 222 relative to the press plate 42.

When the hydraulic fluid is passed out of the hydraulic cylinders 114, 168, 224 when in the proportional directional valves 288, 290, 292 are in the first and second positions, the hydraulic fluid is hot and under pressure and contains gas bubbles from the process. The hydraulic fluid flows through the proportional directional valves 288, 290, 292, into lines 316, 316', 316", and then into the flow divider 298. Provided the pressure of the hydraulic fluid is at or below a predetermined threshold in the flow divider 298, all of the returning hydraulic fluid flows into the heat exchanger 300 which draws heat out of the hydraulic fluid before returning the cooled hydraulic fluid to the reservoir 280 through the inlet 308. If the pressure of the hydraulic fluid is above the predetermined threshold in the flow divider 298, the flow divider 298 opens to directly pass some of the hot hydraulic fluid into the reservoir 280 through the inlet 308. This prevents damage to the heat exchanger 300. Once the pressure of the hydraulic fluid returns to at or below the predetermined threshold in the flow divider 298, the flow divider 298 closes such that all of the returning hydraulic fluid again flows into the heat exchanger 300.

When the hydraulic fluid flows into the reservoir 280 through the inlet 308, the hydraulic fluid contains small gas bubbles. The hydraulic fluid flows from the inlet 308 and through the diffuser 312 which causes gas bubbles in the hydraulic fluid to rise to the top of the hydraulic fluid within the reservoir 280 and into the air space above the hydraulic fluid. For the hydraulic fluid to pass from the diffuser 312 to the pump 282, the hydraulic fluid must pass through the small holes in the baffle plate 310. The baffle plate 310 substantially prevents any remaining gas bubbles from passing therethrough. Instead, the remaining gas bubbles travel upward along a side of the baffle plate 310 which is opposite to the pump 282 and the air space above the hydraulic fluid. As such, a minimal amount of gas bubbles, if any, can pass into the pump 282. This allows for the volume within the reservoir 280, and thus the size of the reservoir 280 to be reduced, since the amount of gas bubbles within the hydraulic system 34 is minimized. Prior art reservoirs are much larger to ensure that the amount of gas in the hydraulic fluid stays at a low level.

Since the hydraulic fluid is cooled and conditioned, and can be continuously used, the reservoir 280 of the form press 20 can be smaller than prior art reservoirs since a smaller volume of hydraulic fluid is needed to operate the form press 20 over prior art presses. In addition, as a result of the design of the form press 20, only a single pump 282 and motor 284 are provided. Prior art presses commonly use a second hydraulic system with a motor and a pump for cooling and filtration of the hydraulic fluid. The small reservoir 280 and single pump 282 and motor 284 reduce the size of the form press 20, over prior art presses which use larger reservoirs ensuring that the amount of gas in the fluid stays in a low level, In addition, the hydraulic system 34 is essentially a closed system such that a minimal amount of outside air is introduced into the hydraulic system 34, and only under certain conditions. This reduces potential contamination, and provides resistant against moisture and cleaning agents. The compensator 302 provides the necessary air to fill the air space above the hydraulic fluid when the hydraulic fluid is pumped into one or more of the hydraulic cylinders 114, 168, 224 (which causes a drop in the hydraulic fluid level within the reservoir 280) such that there is no air exchange during production cycles. The air breather 304 and the compensator 302 provide for the pressure within the reservoir 280 to be slightly overpressured (herein called the desired pressure), which assists in deterring the entrance of contaminates into the hydraulic system 34. The mechanical air breather 304 has specific opening pressures and is such bidirectional. In a first instance, the air breather 304 automatically opens when the pressure in the reservoir 280 is greater than the desired pressure to release air from within the reservoir 280. The air breather 304 thereafter automatically closes when the desired pressure is reached. In a second instance, the air breather 304 automatically opens when the pressure in the reservoir 280 is less than the desired pressure to introduce air into the reservoir 280. The air breather 304 thereafter automatically closes when the desired pressure is reached.

The filter 287 filters contaminates from the hydraulic fluid as it passes therethrough. In addition, when hydraulic fluid is introduced into the hydraulic system 34, it flows through an input line 500 into the filter 287 to reduce contaminates from being introduced into the hydraulic system 34. The hydraulic system 34 further has a line 502 for emptying the reservoir 280.

In addition, the position sensor assemblies 118, 174, 230 and the pressure sensors 294, 296, 294', 296', 294", 296", are used for a referencing process to properly calibrate the final mechanical end positions for the hydraulic cylinders 114, 168, 224. The controller 36 has preprogrammed end mechanical positions for each hydraulic cylinder 114, 168, 224. Upon initial start-up, after a predetermined number of runs, or after parts have been changed out on the form press 20, the referencing process is performed to ensure the proper working of the die assemblies 28, 30, 32.

To affect the referencing process for the first die assembly 28, the die 112 is moved under position control until the position sensor assembly 118 indicates that the block 124b is close to an upper stop 400 on the frame 26, see FIG. 3, which denotes an upper mechanical end position. Thereafter, the speed of the movement of the first die assembly 28 is slowed and the first die assembly 28 is moved under force/position control until the pressure in the hydraulic cylinder 114 is at the force value parameter. This indicates to the controller 36 the furthest upper end position to which the hydraulic cylinder 114 can be extended without damage. The die 112 is then moved under position control until the position sensor assembly 118 indicates that the block 124b is close to a lower stop 402 on the frame 26, see FIG. 3, which denotes a lower mechanical end position. Thereafter, the speed of the movement of the first die assembly 28 is slowed and the first die assembly 28 is moved under force/position control until the pressure in the hydraulic cylinder 114 is at the force value parameter. This indicates to the controller 36 the furthest position to which the hydraulic cylinder 114 can be retracted without damage. These measurements may not correspond to that which is set in the controller 36. The controller 36 then uses the information from the referencing process to denote internal offset values for as to how far the hydraulic cylinder 114 should actually be extended or retracted. This avoids damage to the hydraulic cylinder 114.

Figure 6:
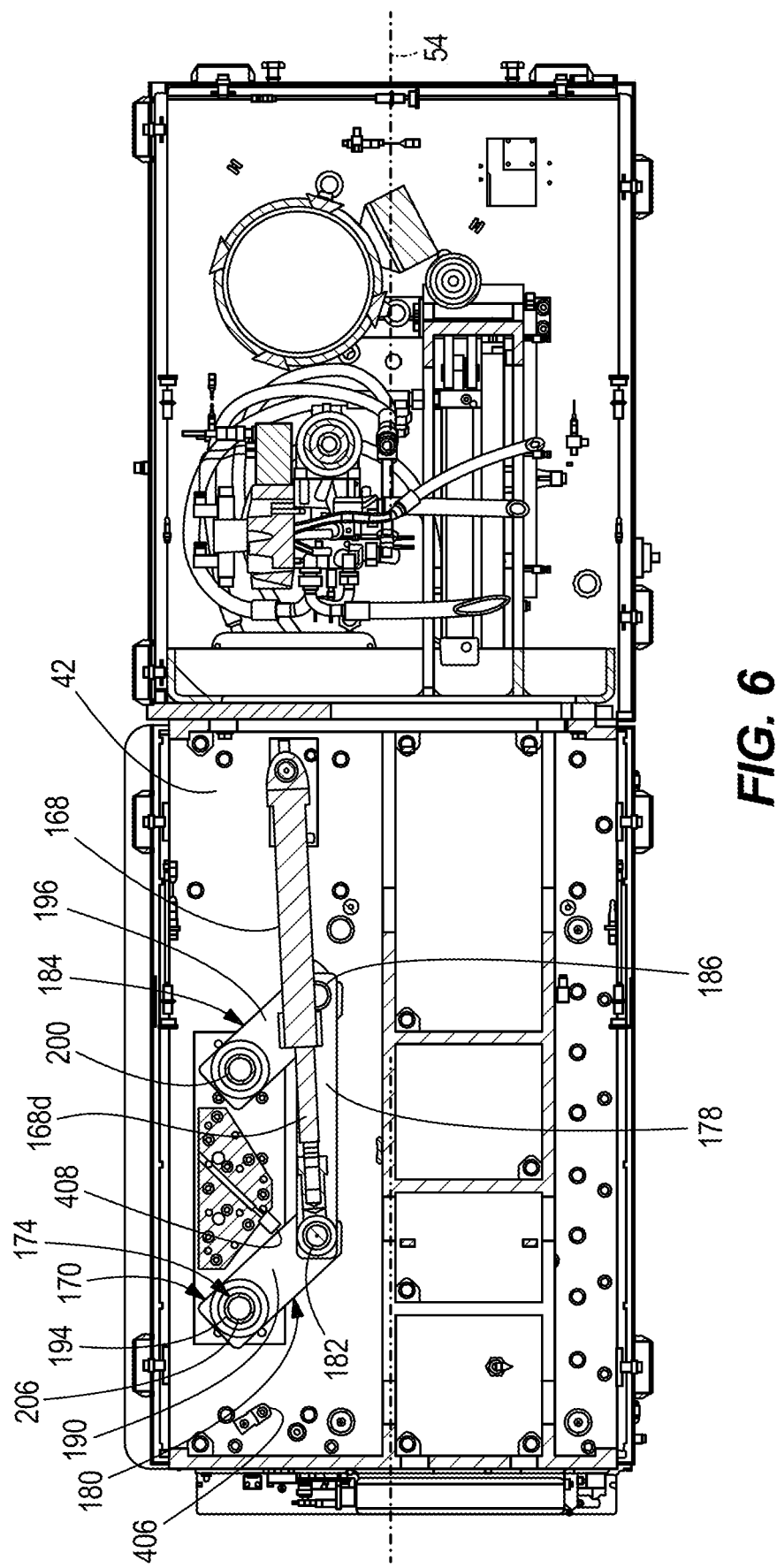
FIG. 6 depicts a cross-sectional view of the form press viewed underneath a press plate of the form press.
Figure 7:
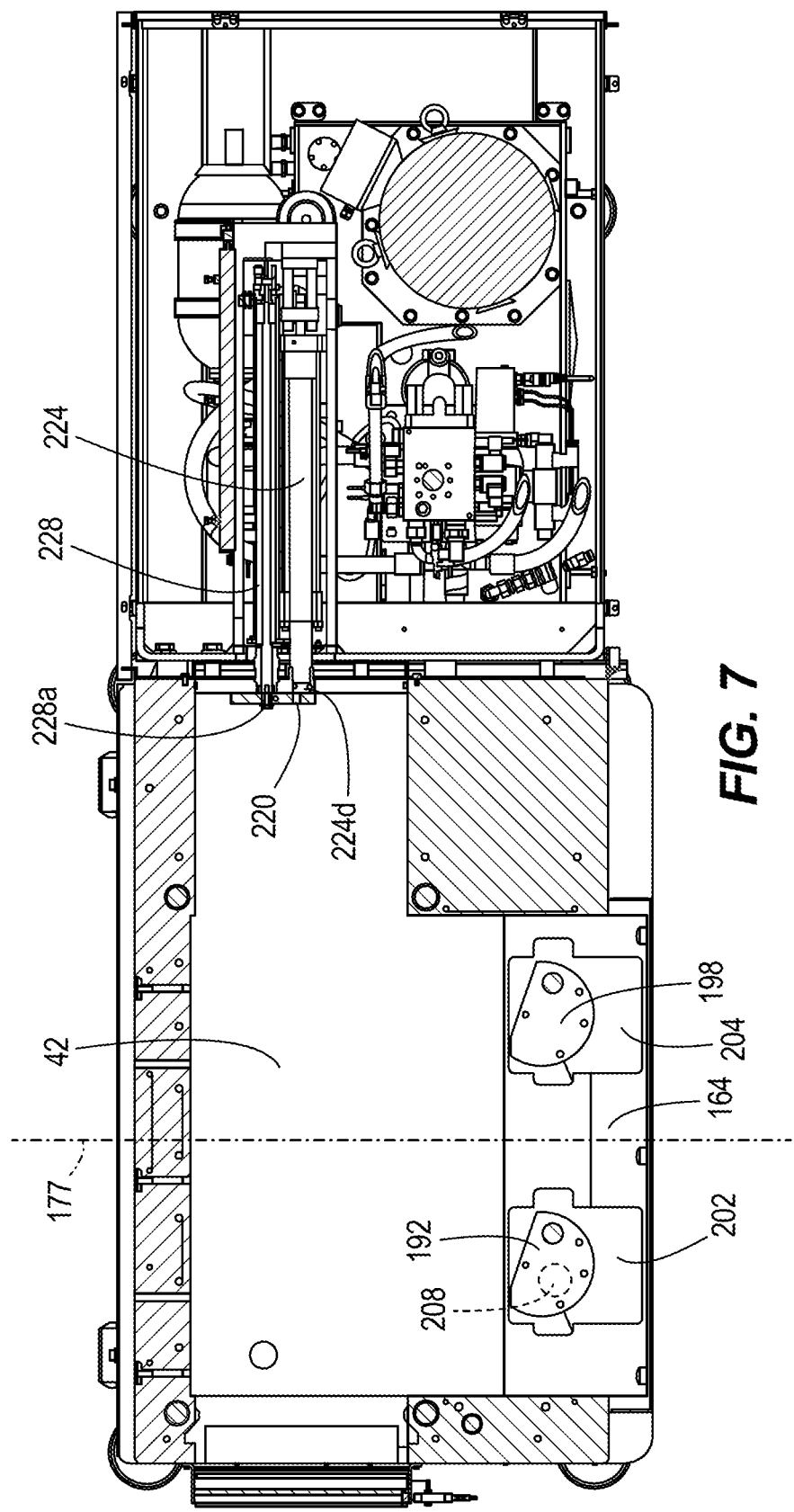
FIGS. 7 and 8 depict cross-sectional views of the form press viewed above the press plate.
Figure 8:
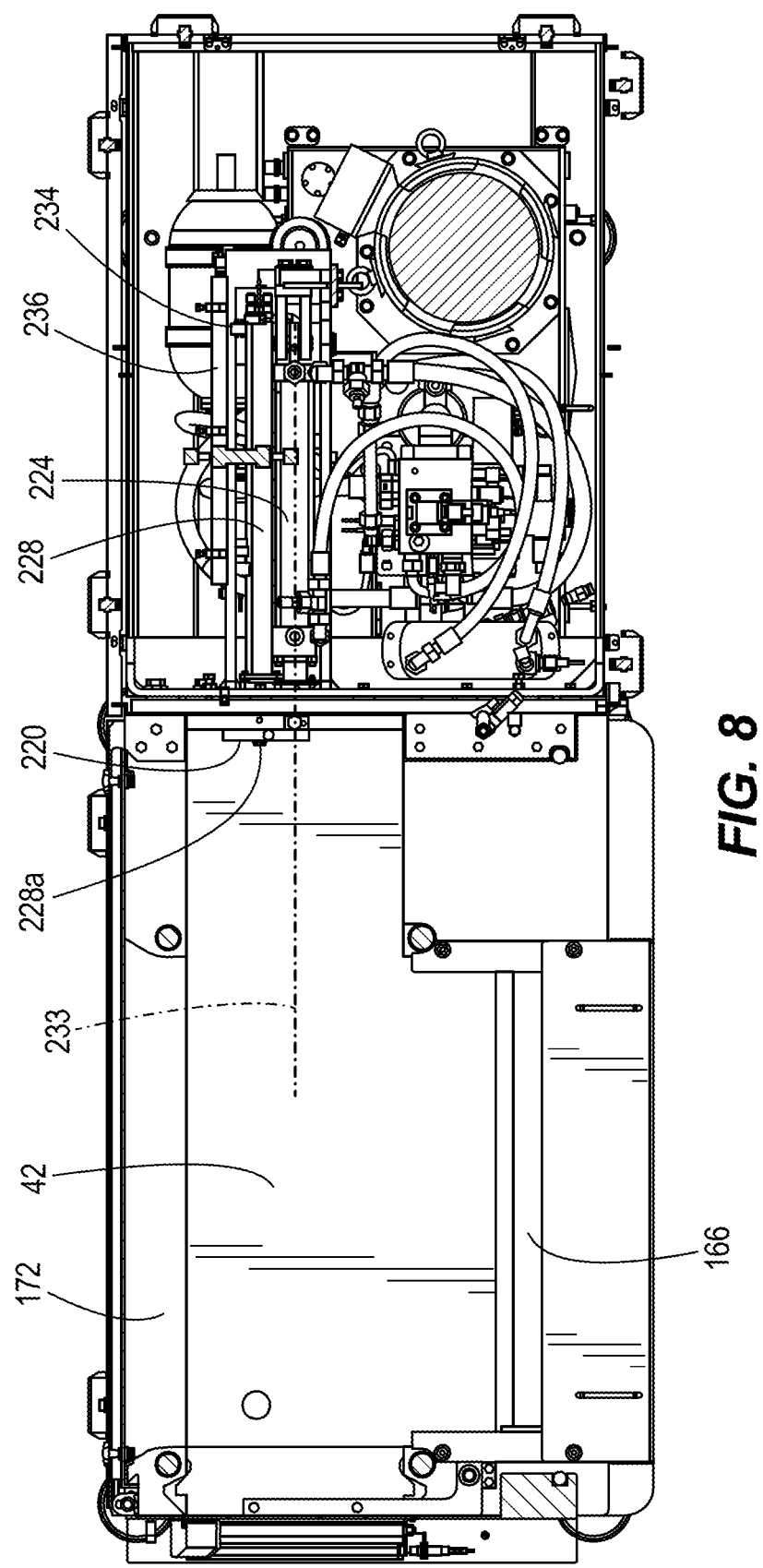

The second die assembly 30 includes end stops 406, 408 as shown in FIG. 6. The third die assembly 32 includes end stops 410, 412 as shown in FIG. 12. Because a separate intervening linkage is not provided between the piston rod 224d and the die plate 220, the end stops 410, 412 are provided at the ends of the chamber 224b. The referencing processes are performed on the second and third die assemblies 30, 32 in the same manner.

Periodically, the form press 20 will perform a reference test which uses the referencing process to ensure the proper working of the die assemblies 28, 30, 32.

The form press 20 provides a stable and robust design, which is capable handling quick changes on the load side. As a result of its design, the form press 20 automatically accelerates the movement of the dies 112, 166, 222, automatically decelerates the movement of the dies 112, 166, 222, and automatically drives the dies 112, 166, 222 forward and backward.

Since the form press 20 only uses a single proportional directional valve 288, 290, 292 and a single position sensor assembly 118, 174, 230 on each press axis 153, 177, 233, a minimum number of active components are provided.

The form press 20 is automatic and a minimum amount of manually settings/adjustments are needed to be input by the operator.

The form press 20 is easily cleaned. The dies 112, 166, 222 are removable from the die plates 110, 164, 220 and replaceable.

Because of the closed loop process used in the form press 20 and the ability to perform the referencing process, building tolerances of the dies 112, 166, 122, temperature drifts, and wear of the components are accounted for in the design of the form press 20.

Unless defined otherwise, all technical and scientific terms used herein have the same meaning as commonly understood by one of skill in the art to which the disclosure pertains. Although any methods and materials similar to or equivalent to those described herein can be used in the practice or testing of the present disclosure, the preferred methods and materials are described herein.

While various examples of the disclosure have been described, it will be apparent to those of ordinary skill in the art that other examples and implementations are possible within the scope of the disclosure. Accordingly, the disclosure is not to be restricted except in light of the attached claims and their equivalents.

The invention claimed is:

1. A form press configured to form press a meat product, the form press comprising:
a frame having a press plate which defines a longitudinal axis;
a first die assembly mounted on the frame and configured to form press the meat product along a height of the meat product, the first die assembly including a first die configured to move along a first press axis which is normal to the longitudinal axis;
a second die assembly mounted on the frame and configured to form press the meat product along a width of the meat product, the second die assembly including a second die configured to move along a second press axis which is normal to the longitudinal axis and normal to the first press axis;
a third die assembly mounted on the frame and configured to form press the meat product along a length of the meat product, the third die assembly including a third die configured to move along a third press axis which is parallel to the longitudinal axis;
wherein the press plate and the plurality of dies define a press chamber therebetween;
each die assembly comprising a hydraulic cylinder having a piston and piston rod, each hydraulic cylinder defined by a bottom-side chamber and a rod-side chamber;
a closed-loop hydraulic control system configured to control each hydraulic cylinder of the corresponding die assembly, the hydraulic control system including:
a controller;
a proportional direction valve operatively coupled to the bottom-side chamber and to the rod-side chamber of each corresponding hydraulic cylinder;
a bottom-side pressure sensor operatively coupled to the bottom-s-de chamber of each corresponding hydraulic cylinder;
a rod-side pressure sensor opertatively coupled to the rod-side chamber of each corresponding hydraulic cylinder;
a position sensor configured to provide a relative position of the piston rod of each corresponding hydraulic cylinder;
the contoller operatively coupled to each corresponding proportional directional valve, the bottom-side pressure sensor, the rod-side pressure sensor, and the position sensor, of each corresponding hydraulic cylinder;

the controller configured to control the hydraulic cylinders in a closer-loop manner based on information for each corresponding hydraulic cylinder, the information including:
- an operating position of each corresponding proportional directional valve;
- pressure information provided by the bottom-side pressure sensor and the rod-side pressure sensor; and
- position information provided by the position sensor; and wherein the controller varies the operating position of each corresponding propertional directional valve iteratively between an open operating position, a neutral operating position, and a reverse operating position, until each die assembly provides a predetermined pressure level against the meat product exerted by each corresponding die assembly.

2. The form press of claim 1, wherein the controller is configured to initially move each proportional directional valve to the first position based upon positional values from the respective position sensor, and wherein the controller is configured to thereafter move each proportional directional valve to one of the neutral and the reverse operating positions based upon pressure values from the respective pressure sensors.

3. The form press of claim 2, wherein the controller is further configured to move each proportional directional valve to the neutral position based upon positional values from the respective position sensor.

4. The form press of claim 1, further comprising a linkage coupled between the hydraulic cylinder of the first die assembly and the first die, wherein the position sensor of the first die assembly senses a vertical position of a component of the linkage.

5. The form press of claim 4, wherein the position sensor of the first die assembly is a linear position sensor.

6. The form press of claim 4, further comprising a linkage coupled between the hydraulic cylinder of the second die assembly and the second die, wherein the position sensor of the second die assembly senses a rotational position of a component of the linkage of the second die assembly.

7. The form press of claim 6, wherein the position sensor of the second die assembly is an encoder.

8. The form press of claim 1, further comprising a linkage coupled between the hydraulic cylinder of the second die assembly and the second die, wherein the position sensor of the second die assembly senses a rotational position of a component of the linkage.

9. The form press of claim 1, wherein the position sensor of the first and third die assemblies is a linear position sensor.

10. The form press of claim 9, wherein the position sensor of the second die assembly is an encoder.

11. The form press of claim 1, wherein the position sensor of the second die assembly is an encoder.

12. The form press of claim 1, wherein the controller is configured to perform a referencing process for each die assembly, wherein the controller is configured to move the respective die assembly to a first predetermined position based upon information from the position sensor thereof and measure the pressure from the pressure sensors thereof and generate a value to which the respective hydraulic cylinder is to be extended, and the controller is configured to move the respective die assembly to a second predetermined position based upon the information from the position sensor thereof and measure the pressure from the pressure sensors thereof and generate a value to which the respective hydraulic cylinder is to be retracted.

13. The form press of claim 1, further comprising:
a reservoir containing hydraulic fluid;
a compensator defining a cavity having air therein, the compensator being attached to the reservoir and in sealed communication with the cavity within the reservoir, wherein air from the compensator is configured to move into the reservoir and air from the reservoir is configured to move into the compensator; and
a bi-directional air breather mounted on the reservoir and in communication with the cavity, the air breather being configured to open upon predetermined pressures within the reservoir.

14. The form press of claim 1, further comprising:
a reservoir containing hydraulic fluid and an hydraulic pump;
a flow divider in communication with a return line of each proportional directional valve;
a heat exchanger in communication with the flow divider, wherein the flow divider is configured to divert the hydraulic fluid from the return lines directly to the reservoir when a predetermined pressure is reached in the return lines.

15. The form press of claim 14, further comprising:
a compensator defining a cavity having air therein, the compensator being attached to the reservoir and in sealed communication with the cavity within the reservoir, wherein air from the compensator is configured to move into the reservoir and air from the reservoir is configured to move into the compensator; and
a bi-directional air breather mounted on the reservoir and in communication with the cavity, the air breather being configured to open upon predetermined pressures within the reservoir.

16. The form press of claim 15, further comprising a diffuser at an inlet to the reservoir, and a baffle plate within the reservoir, wherein the baffle plate is between the inlet and the pump.

17. A form press configured to form press a meat product, the form press comprising:
a frame having a press plate which defines a longitudinal axis;
a first die assembly mounted on the frame and configured to form press the meat product along a height of the meat product, the first die assembly including a first die configured to move along a first press axis which is normal to the longitudinal axis;
a second die assembly mounted on the frame and configured to form press the meat product along a width of the meat product, the second die assembly including a second die configured to move along a second press axis which is normal to the longitudinal axis and normal to the first press axis;
a third die assembly mounted on the frame and configured to form press the meat product along a length of the meat product, the third die assembly including a third die configured to move along a third press axis which is parallel to the longitudinal axis;
wherein the press plate and the plurality of dies define a press chamber therebetween;
each die assembly comprising a hydraulic cylinder having a piston and a piston rod, each hydraulic cylinder defined by a bottom-side chamber and a rod-side chamber;

a closed-loop hydraulic control system configured to control each hydraulic cylinder of the corresponding die assembly, the hydraulic control system including:
a controller;
a proportional directional valve operatively coupled to the bottom-side chamber and to the rod-side chamber of each corresponding hydraulic cylinder;
a bottom-side pressure sensor operatively coupled to the bottom-side chamber of each corresponding hydraulic cylinder;
a rod-side pressure sensor operatively coupled to the rod-side chamber of each corresponding hydraulic cylinder; and
a position sensor configured to provide a relative position of the piston rod or piston of each corresponding hydraulic cylinder;
the controller operatively coupled to each corresponding proportional directional valve, the bottom-side pressure sensor, the rod-side pressure sensor, and the position sensor, of each corresponding hydraulic cylinder, the controller configured to control the hydraulic cylinders in a closed-loop manner based on information for each corresponding hydraulic cylinder, the information including:
an operating position of each corresponding proportional directional valve;
pressure valves provided by the bottom-side pressure sensor and the rod-side pressure sensor; and
position information provided by the position sensor;
the form press further including:
a reservoir containing hydraulic fluid and a pump configured to pump configured to communication the hydraulic fluid to each of the hydraulic cylinders;
a compensator defining a cavity having air therein, the compensator being attached to the reservoir and in sealed communication with the cavity within the reservoir, wherein air from the compensator is configured to move into the reservoir and air from the reservoir is configured to move into the compensator;
a bi-directional air breather mounted on the reservoir and in communication with the cavity, the air breather being configured to open upon predetermined pressures within the reservoir; and
wherein the controller varies the operating position of each corresponding propertional direction valve iteratively between an open operating position, a neutral operating position, and a reverse operating position, until each die assembly provides predetermined pressure level exerted against the meat product.

18. The form press of claim 17, further comprising:
a flow divider in communication with a return line of each proportional directional valve;
a heat exchanger in communication with the flow divider, wherein the flow divider is configured to divert the hydraulic fluid from the return lines directly to the reservoir when a predetermined pressure is reached in the return lines.

19. The form press of claim 17, further comprising a diffuser at an inlet to the reservoir, and a baffle plate within the reservoir, wherein the baffle plate is between the inlet and the pump.

20. The form press of claim 17, further comprising a filter between the reservoir and the proportional directional valves.

21. A form press configured to form press a meat product, the form press comprising:

a frame having a press plate which defines a longitudinal axis;
a reservoir defining a cavity having hydraulic fluid therein;
a first die assembly mounted on the frame and configured to form press the meat product along a height of the meat product, the first die assembly including a first die configured to move along a first press axis which is normal to the longitudinal axis;
a second die assembly mounted on the frame and configured to form press the meat product along a width of the meat product, the second die assembly including a second die configured to move along a second press axis which is normal to the longitudinal axis and normal to the first press axis;
a third die assembly mounted on the frame and configured to form press the meat product along a length of the meat product, the third die assembly including a third die configured to move along a third press axis which is parallel to the longitudinal axis;
wherein the press plate and the plurality of dies define a press chamber therebetween;
each die assembly comprising a hydraulic cylinder having a piston and a piston rod, each hydraulic cylinder defined by a bottom-side chamber and a rod-side chamber;
a closed-loop hydraulic control system configured to control each hydraulic cylinder of the corresponding die assembly, the hydraulic control system including:
a controller;
a proportional directional valve operatively coupled to the bottom-side chamber and to the rod-side chamber of each corresponding hydraulic cylinder;
a bottom-side pressure sensor operatively coupled to the bottom-side chamber of each corresponding hydraulic cylinder;
a rod-side pressure sensor operatively coupled to the rod-side chamber of each corresponding hydraulic cylinder; and
a position sensor configured to provide a relative position of the piston rod or piston of each corresponding hydraulic cylinder;
the controller operatively coupled to each corresponding proportional directional valve, the bottom-side pressure sensor, the rod-side pressure sensor, and the position sensor, of each corresponding hydraulic cylinder, the controller configured to control the hydraulic cylinders in a closed-loop manner based on information for each corresponding hydraulic cylinder, the information including:
an operating position of each corresponding proportional directional valve;
pressure valves provided by the bottom-side pressure sensor and the rod-side pressure sensor; and
position information provided by the position sensor;
wherein the controller varies the operating position of each corresponding proportional directional valve iteratively between an open operating position, a neutral operating position, and a reverse operating position, until each die assembly provides a predetermined pressure level exerted against the meat product;
a single hydraulic pump configured to pump the hydraulic fluid from the reservoir to an input line of each proportional directional valve of the corresponding die assembly;
a flow divider in communication with a return line of each proportional directional valve;

a heat exchanger in communication with the flow divider; and wherein the flow divider is configured to divert the hydraulic fluid from the return lines directly to the reservoir when a predetermined pressure is reached in the return lines.

22. The form press of claim 21, further comprising a diffuser at an inlet to the reservoir, and a baffle plate within the reservoir, wherein the baffle plate is between the inlet and the pump.

* * * * *

UNITED STATES PATENT AND TRADEMARK OFFICE
CERTIFICATE OF CORRECTION

PATENT NO. : 11,412,744 B2  Page 1 of 1
APPLICATION NO. : 16/859133
DATED : August 16, 2022
INVENTOR(S) : Singenberger et al.

It is certified that error appears in the above-identified patent and that said Letters Patent is hereby corrected as shown below:

In the Claims

In Column 18, Claim 1, Line 56, delete "bottom-s-de" and insert -- bottom-side --, therefor.

In Column 18, Claim 1, Line 64, delete "contoller" and insert -- controller --, therefor.

In Column 19, Claim 1, Line 12, delete "propertional" and insert -- proportional --, therefor.

In Column 20, Claim 17, Line 65, delete "and a piston rod," and insert -- and piston rod, --, therefor.

In Column 21, Claim 17, Line 32, delete "pump configured to communication" and insert -- communicate --, therefor.

In Column 21, Claim 17, Line 46, delete "propertional" and insert -- proportional --, therefor.

In Column 21, Claim 17, Line 49, after "provides" insert -- a --.

In Column 22, Claim 21, Line 24, delete "and a piston rod," and insert -- and piston rod, --, therefor.

In Column 22, Claim 21, Line 31, before "proportional" insert -- single --.

Signed and Sealed this
Twenty-seventh Day of September, 2022

Katherine Kelly Vidal
*Director of the United States Patent and Trademark Office*